United States Patent
Wang et al.

(10) Patent No.: US 11,632,563 B2
(45) Date of Patent: Apr. 18, 2023

(54) MOTION VECTOR DERIVATION IN VIDEO CODING

(71) Applicant: QUALCOMM Incorporated, San Diego, CA (US)

(72) Inventors: Hongtao Wang, San Diego, CA (US); Wei-Jung Chien, San Diego, CA (US); Vadim Seregin, San Diego, CA (US); Yu Han, San Diego, CA (US); Marta Karczewicz, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 24 days.

(21) Appl. No.: 16/793,751

(22) Filed: Feb. 18, 2020

(65) Prior Publication Data
US 2020/0275118 A1 Aug. 27, 2020

Related U.S. Application Data

(60) Provisional application No. 62/809,476, filed on Feb. 22, 2019.

(51) Int. Cl.
| | |
|---|---|
| *H04N 19/513* | (2014.01) |
| *H04N 19/52* | (2014.01) |
| *H04N 19/54* | (2014.01) |
| *H04N 19/105* | (2014.01) |
| *H04N 19/139* | (2014.01) |

(52) U.S. Cl.
CPC .......... *H04N 19/513* (2014.11); *H04N 19/52* (2014.11)

(58) Field of Classification Search
CPC .. H04N 19/139; H04N 19/105; H04N 19/176; H04N 19/52; H04N 19/513
See application file for complete search history.

(56) References Cited

U.S. PATENT DOCUMENTS

| | | | |
|---|---|---|---|
| 7,352,905 B2 | 4/2008 | Mukerjee et al. | |
| 8,824,562 B2 | 9/2014 | Kim et al. | |
| 9,615,090 B2 * | 4/2017 | Zhang | H04N 19/597 |
| 11,089,323 B2 * | 8/2021 | Chuang | H04N 19/119 |
| 11,197,016 B2 | 12/2021 | Zhang et al. | |

(Continued)

OTHER PUBLICATIONS

Improved Affine Motion Vector Coding; Chen—2016. (Year: 2016).*

(Continued)

*Primary Examiner* — Luis Perez-Fuentes
(74) *Attorney, Agent, or Firm* — Shumaker & Sieffert, P.A.

(57) ABSTRACT

Techniques related to derivation of motion vectors of a first color component (e.g., chroma component) from motion vectors of a second color component (e.g., luma component) are described. A video coder (e.g., video encoder or video decoder), for a CU coded in affine mode with 4:4:4 color format, may determine a motion vector for each sub-block of the luma block, and determine a motion vector for each sub-block of the chroma block based only on the motion vector for each co-located (also called collocated) sub-block of the luma block. However, for another CU coded in affine mode but with a color format other than 4:4:4 (e.g., 4:2:2 or 4:2:0), the video coder may determine a motion vector for each sub-block of the chroma block based on an average of two or more motion vectors of sub-blocks of the luma block.

29 Claims, 14 Drawing Sheets

(56) References Cited

U.S. PATENT DOCUMENTS

| | | | |
|---|---|---|---|
| 2005/0156941 A1* | 7/2005 | Sloan | G06T 15/60 345/584 |
| 2012/0219216 A1 | 8/2012 | Sato | |
| 2014/0169472 A1* | 6/2014 | Fludkov | H04N 19/42 375/240.16 |
| 2015/0124865 A1* | 5/2015 | Kim | H04N 19/136 375/240.02 |
| 2019/0222865 A1* | 7/2019 | Zhang | H04N 19/139 |
| 2019/0238864 A1* | 8/2019 | Xiu | H04N 19/126 |
| 2019/0281294 A1* | 9/2019 | Kim | H04N 19/157 |
| 2020/0275118 A1* | 8/2020 | Wang | H04N 19/139 |
| 2020/0296382 A1* | 9/2020 | Zhao | H04N 19/119 |
| 2020/0374562 A1 | 11/2020 | Piao et al. | |
| 2020/0382795 A1* | 12/2020 | Zhang | H04N 19/513 |
| 2021/0203978 A1* | 7/2021 | Kim | H04N 19/176 |
| 2021/0211710 A1* | 7/2021 | Zhang | H04N 19/172 |
| 2021/0238864 A1* | 8/2021 | Heatwole | A01K 31/18 |
| 2021/0243465 A1* | 8/2021 | Chen | H04N 19/176 |

OTHER PUBLICATIONS

Affine transform prediction for next generation of video coding; 2015. (Year: 2015).*

Bossen F., et al., "JVET Common test Conditions and Software Reference Configurations for SDR Video", Joint Video Experts Team (JVET) of ITU-T SG 16 WP 3 and ISO/IEC JTC 1/SC 29/WG 11, Document: JVET-L1010-v1, 12th Meeting: Macao, CN, Oct. 3-12, 2018, pp. 1-5.

Chen J., et al., "Algorithm description for Versatile Video Coding and Test Model 4 (VTM 4)", Joint Video Experts Team (JVET) of ITU-T SG 16 WP 3 and ISO/IEC JTC 1/SC 29/WG 11, JVET-M1002-v1, Jan. 9-18, 2019, 61 pages.

Filippov (Huawei) A, et al., "Support of 4:4:4 and 4:2:2 Chroma Formats in WC", 126. MPEG Meeting; Mar. 19, 2019-Mar. 27, 2019, Geneva; (Motion Picture Expert Group or ISO/IEC JTC1/SC29/WG11), No. m47660, Mar. 29, 2019 (Mar. 29, 2019), XP030211813, 7 pages, Retrieved from the Internet:URL: http://phenix.int-evry.fr/mpeg/doc_end_user/documents/126_Geneva/wg11/m47660-JVET-N0671-v5-JVET-N0671-v5.zip JVET-N0671_v3.docx, [retrieved-on Mar. 29, 2019], Section 2.2.

International Search Report and Written Opinion—PCT/US2020/018846—ISA/EPO—dated May 18, 2020.

Rosewarne C., et al., "Common Test conditions and Software Reference Configurations for HEVC Range Extensions", Joint Collaborative Team on Video Coding (JCT-VC) of ITU-T SG 16 WP 3 and ISO/IEC JTC 1/SC 29/WG 11, 16th Meeting: San José, US, Jan. 9-17, 2014,Document: JCTVC-P1006, pp. 1-10.

Tamse A, et al., "CE2-related: MV Derivation for Affine Chroma",13. JVET Meeting; Jan. 9, 2019-Jan. 18, 2019, Marrakech; (The Joint Video Exploration Team of ISO/IEC JTC1/SC29/WG11 and ITU-T SG.16 ), No. JVET-M0192, Jan. 3, 2019 (Jan. 3, 2019), XP030200366, 5 pages, Retrieved from the Internet:URL: http://phenix.int-evry.fr/jvet/doc_end_user/documents/13_Marrakech/wg11/JVET-M0192-v1 .zip JVET-M0192-v1.docx [retrieved on Jan. 3, 2019], abstract, Sections 1 and 2.

Yu H., et al., "Common test Conditions for Screen Content Coding", Joint Collaborative Team on Video Coding (JCT-VC) of ITU-T SG 16 WP 3 and ISO/IEC JTC 1/SC 29/WG 11, 21st Meeting: Warsaw, PL, Jun. 19-26, 2015,Document JCTVC-UT1015-r2, pp. 1-10.

Bross B., et al., "Output Document Approved by JVET", Joint Video Experts Team (JVET) of ITU-T SG 16 WP 3 and ISO/IEC JTC 1/SC 29/WG 11, JVET-M1001-v3, 13th Meeting: Marrakech, MA, Jan. 9-18, 2019, 254 pages.

Bross B, et al., "Versatile Video Coding (Draft 3)," 12, JVET Meeting; Oct. 3, 2018-Oct. 12, 2018, Macao, (The Joint Video Exploration Team of ISO/IEC JTC1/SC29/WG11 and ITU-T SG.16), No. JVET-L1001-v9, Jan. 8, 2019 (Jan. 8, 2019), XP030200889, 230 pages, Retrieved from the Internet: URL: http://phenix.int-evry.fr/jvet/doc_end_user/documents/12_Macao/wg11/JVET-L1001-v13.zip JVET-L1001-v9.docx [retrieved on Jan. 8, 2019] Section 8.4.4.9, Definition clauses 3.22 and 3.23, Section 8.4.2.13.

Bross B., et al., "Versatile Video Coding (Draft 5)", 14. JVET Meeting, Mar. 19, 2019-Mar. 27, 2019, Geneva, (The Joint Video Exploration Team of ISO/IEC JTC1/SC29/WG11 and ITU-T SG.16), No. JVET-N1001-v10, Jun. 11, 2019 (Jun. 11, 2019), XP030205561, 408 pages, Retrieved from the Internet: URL:http://phenix.int-evry.fr/jvet/doc_end_user/documents/14_Geneva/wg11/JVET-N1001-v10.zip JVET-N1001-v10.docx [retrieved on Jun. 11, 2019] abstract section 2, sections 7.3.2.4 and 7.4 3.4, section 7.3 7.5, section 7.3.7.10.

IEEE Std 802.11ad-2012: "Part 11: Wireless LAN Medium Access Control (MAC) and Physical Layer (PHY) Specifications—Amendment 3: Enhancements for Very High Throughput in the 60 GHz Band", LAN/MAN Standards Committee of the IEEE Computer Society, Dec. 28, 2012, 628 Pages.

"Infonnation Technology—Dynamic Adaptive Streaming Over HTTP (DASH)—Part 1: Media Presentation Description and Segment Formats", ISO/IEC 23009-1, International Standard, Draft Third Edition, Jan. 9, 2017, 216 pages.

ITU-T H.223, "Series H: Audiovisual and Multimedia Systems, Infrastructure of Audiovisual Services—Transmission Multiplexing and Synchronization, Multiplexing Protocol for Low Bit Rate Multimedia Communication", The International Telecommunication Union, Jul. 2001, 74 Pages.

ITU-T H.265: "Series H: Audiovisual and Multimedia Systems Infrastructure of Audiovisual Services—Coding of Moving Video", High Efficiency Video Coding, The International Telecommunication Union, Jun. 2019, 696 Pages.

Bross B., et al., "Versatile Video Coding (Draft 7)", 16th JVET Meeting, Oct. 1, 2019-Oct. 11, 2019, Geneva, CH (The Joint Video Exploration Team of ISO/IEC JTC1/SC29/WG11 and ITU-T SG. 16), No. JVET-P2001, m51515, Nov. 14, 2019 (Nov. 14, 2019), XP030224328, 493 Pages; see pp. 68-72 and 241-266.

Bross B., et al., "Versatile Video Coding (Draft 8)", 17. JVET Meeting; Jan. 7, 2020-Jan. 17, 2020; Brussels; (The Joint Video Exploration Team of ISO/IEC JTC1/SC29/WG11 and ITU-T SG.16 WP 3), No. JVET-Q2001-v1; m52905, Brussels, BE, Jan. 18, 2020, 495 Pages XP030224280; see pp. 69-73 and 242-267.

* cited by examiner

MOTION VECTOR DERIVATION IN VIDEO CODING

This application claims the benefit of U.S. Provisional Application 62/809,476, filed Feb. 22, 2019, the entire content of which is incorporated by reference herein.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes prediction techniques using motion vectors in video codecs. For example, the disclosure describes techniques related to derivation of motion vectors of a first color component (e.g., chroma component) from motion vectors of a second color component (e.g., luma component). As described in more detail below, a coding unit (CU) that includes a luma block of luma components and a chroma block of chroma components may be coded in affine mode with 4:4:4 color format. In 4:4:4 color format, the size (e.g., height and width) of the luma and chroma blocks is the same. In affine mode, the luma block and the chroma block are divided into a plurality of sub-blocks.

In one or more examples, a video coder (e.g., video encoder or video decoder) may determine a motion vector for each sub-block of the luma block, and determine a motion vector for each sub-block of the chroma block based only on the motion vector for each co-located (also called collocated) sub-block of the luma block. However, for another block coded in affine mode but with a color format other than 4:4:4 (e.g., 4:2:2 or 4:2:0), the video coder may determine a motion vector for each sub-block of the chroma block based on an average of two or more motion vectors of sub-blocks of the luma block. As noted above, in 4:4:4 color format, the height and width of the luma and chroma blocks is the same. In 4:2:2 color format, the height of the luma and chroma blocks is the same, but the width of the chroma block is one half the width of the luma block. In 4:2:0 color format, the height and width of the chroma block is one half the height and width of the luma block.

In this way, rather than averaging motion vectors of sub-blocks of a luma block to determine a motion vector for a sub-block of a chroma block regardless of the color format, in one or more examples, a video coder may differentiate between the way in which to determine motion vectors for sub-blocks of a chroma block based on the color format. For instance, for 4:4:4 color format, there may not be any averaging of motion vectors of sub-blocks of a luma block for determining motion vectors of sub-blocks of a chroma block. However, for 4:2:2 or 4:2:0 color format, there may be averaging of motion vectors of sub-blocks of a luma block for determining motion vectors of sub-blocks of a chroma block.

By bypassing averaging of motion vectors of sub-blocks of a luma block for determining motion vectors of sub-blocks of a chroma block for 4:4:4 color format, the number of operations that need to be performed by the video coder may be reduced, which promotes processing efficiency. Moreover, in some examples, using the motion vector of only the co-located sub-block of a luma block to determine a motion vector of a sub-block of a chroma block may result in better coding performance as the motion vector of the sub-block may be a better motion vector in terms of coding performance (e.g., reduction in number of bits that are signaled while maintaining quality of reconstructed video) as compared to averaged motion vectors.

In one example, the disclosure describes a method of decoding video data, the method comprising determining that a coding mode for a coding unit (CU) is affine mode, determining that a color format of the CU that includes a luma block and a chroma block is 4:4:4 color format, determining a motion vector for each sub-block of the luma block based on control point motion vectors for the CU, determining a motion vector for each sub-block of the chroma block based only on the motion vector of each co-located sub-block of the luma block, and reconstructing the CU based on the motion vector for each sub-block of the luma block and the motion vector for each sub-block of the chroma block.

In one example, the disclosure describes a method of encoding video data, the method comprising determining that a coding mode for a coding unit (CU) is affine mode, determining that a color format of the CU that includes a luma block and a chroma block is 4:4:4 color format, determining a motion vector for each sub-block of the luma block based on control point motion vectors for the CU, determining a motion vector for each sub-block of the chroma block based only on the motion vector of each co-located sub-block of the luma block, and encoding the CU based on the motion vector for each sub-block of the luma block and the motion vector for each sub-block of the chroma block.

In one example, the disclosure describes a device for coding video data, the device comprising memory configured to store the video data and processing circuitry coupled to the memory and comprising at least one of fixed-function or programmable circuitry. The processing circuitry is configured to determine that a coding mode for a coding unit (CU) is affine mode, determine that a color format of the CU that includes a luma block and a chroma block is 4:4:4 color format, determine a motion vector for each sub-block of the luma block based on control point motion vectors for the CU, determine a motion vector for each sub-block of the chroma block based only on the motion vector of each co-located sub-block of the luma block, and code the CU based on the motion vector for each sub-block of the luma block and the motion vector for each sub-block of the chroma block.

In one example, the disclosure describes a computer-readable storage medium having instructions stored thereon that when executed cause one or more processors of a device for coding video data to determine that a coding mode for a coding unit (CU) is affine mode, determine that a color format of the CU that includes a luma block and a chroma block is 4:4:4 color format, determine a motion vector for each sub-block of the luma block based on control point motion vectors for the CU, determine a motion vector for each sub-block of the chroma block based only on the motion vector of each co-located sub-block of the luma block, and code the CU based on the motion vector for each sub-block of the luma block and the motion vector for each sub-block of the chroma block.

In one example, the disclosure describes a device for coding video data, the device comprising means for determining that a coding mode for a coding unit (CU) is affine mode, means for determining that a color format of the CU that includes a luma block and a chroma block is 4:4:4 color format, means for determining a motion vector for each sub-block of the luma block based on control point motion vectors for the CU, means for determining a motion vector for each sub-block of the chroma block based only on the motion vector of each co-located sub-block of the luma block, and means for coding the CU based on the motion vector for each sub-block of the luma block and the motion vector for each sub-block of the chroma block.

The details of one or more examples are set forth in the accompanying drawings and the description below. Other features, objects, and advantages will be apparent from the description, drawings, and claims.

DETAILED DESCRIPTION

Figure 1:
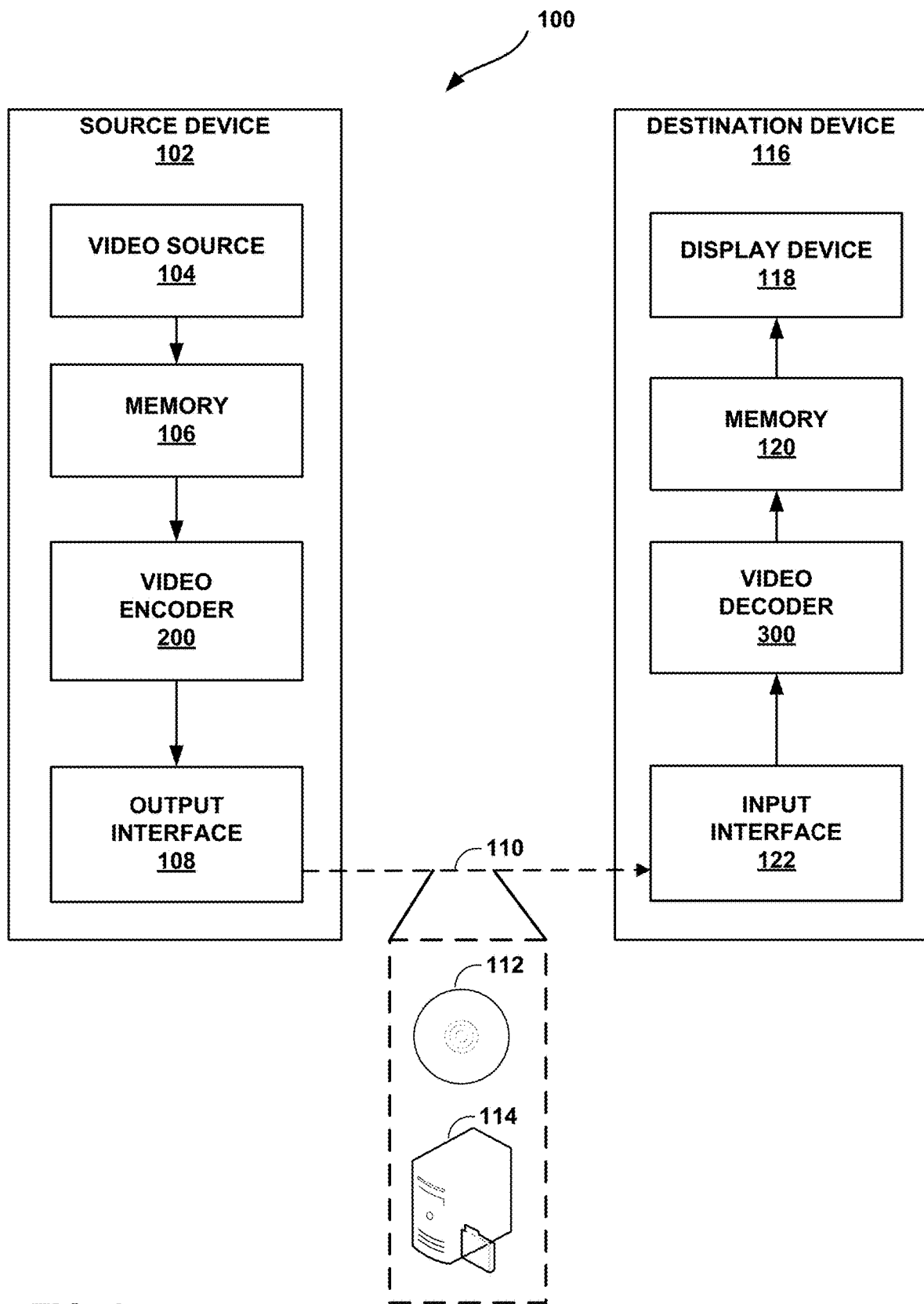
FIG. 1 is a block diagram illustrating an example video encoding and decoding system that may perform the techniques of this disclosure.

This disclosure describes example techniques for video coding based on color format of a coding unit (CU). A CU includes a luma block of luma components and one or more chroma blocks of chroma components (e.g., a Cb chroma block of Cb chroma components and a Cr block of Cr chroma components). The color format refers to resolution of luma and chroma blocks. In some examples, the chroma block of the CU may be downsampled relative to the luma block of the CU. For example, in a color format referred to as 4:2:0, a width of the chroma block is half the width of the luma block and a height of the chroma block is half the height of the luma block, and therefore, a size of the chroma block is a quarter the size of the luma block. In a color format referred to as 4:2:2, a width of the chroma block is half the width of the luma block and a height of the chroma block is same as the height of the luma block, and therefore, a size of the chroma block is half the size of the luma block.

However, the chroma block being downsampled relative to the luma block is not necessary in all cases. For example, in a color format referred to as 4:4:4, a width of the chroma block and a width of the luma block is the same, and a height of the chroma block and a height of the luma block is the same, and therefore, a size of the chroma block is same as the size of the luma block.

One example way in which to code a CU is in affine mode. In affine mode, a video coder (e.g., video encoder or video decoder) determines control point motion vectors, which may be motion vectors from two or three corner points of the CU. In affine mode, the video coder divides the luma block of the CU and the chroma block of the CU into a plurality of sub-blocks. For the luma block, the video coder determines motion vectors for each of the sub-blocks based on the control point motion vectors. For the chroma block, the video coder determines motion vectors for each of the sub-blocks based on motion vectors for the sub-blocks of the luma block.

In one or more examples described in this disclosure, the video coder may implement different operations to determine motion vectors for the sub-blocks of the chroma block (i.e., chroma sub-blocks) based on the color format. For example, if a coding mode for the CU is affine mode and a color format for the CU is 4:4:4, then the video coder may determine a motion vector for each sub-block of the chroma block (i.e., chroma sub-block) based only on the motion vector for each co-located (also called collocated) sub-block of the luma block (i.e., luma sub-block). For instance, due to the 4:4:4 color format, for every luma sub-block in the luma block there is one co-located chroma sub-block in the chroma block. For example, the top-left luma sub-block is co-located with the top-left chroma sub-block, the luma sub-block left of the top-left luma sub-block is co-located with the chroma sub-block left of the top-left chroma sub-block, and so forth. As one example, the video coder may set the motion vector of each chroma sub-block equal to the motion vector of each co-located luma sub-block. In some examples, scaling of the luma sub-block motion vector may be utilized based on differences in vector precision.

For a non-4:4:4 color format (e.g., 4:2:2 or 4:2:0), there may not be one chroma sub-block that is co-located with one luma sub-block. Rather, one chroma sub-block may be co-located with a group of luma sub-blocks. For instance, for 4:2:0 color format, for every chroma sub-block there are four luma sub-blocks, and for 4:2:2 color format, for every chroma sub-block there are two luma sub-blocks. In such examples, the video coder may perform averaging of the motion vectors of the luma sub-blocks to determine the motion vector for a chroma sub-block. As one example, for 4:2:0 color format, the video coder may average the motion vectors of four luma sub-blocks to determine a motion vector for a chroma sub-block. For 4:2:2 color format, the video coder may average the motion vectors of two luma sub-blocks to determine a motion vector for a chroma sub-block.

Accordingly, in one or more examples, the video coder may perform averaging of motion vectors of luma sub-blocks to determine a motion vector of a chroma sub-block (e.g., for 4:2:2 or 4:2:0 color formats) or not perform averaging of motion vectors of luma sub-blocks to determine a motion vector of a chroma sub-block (e.g., for 4:4:4 color format) based on the color format. In some techniques, the video coder may have performed averaging of motion vectors of luma sub-blocks to determine motion vectors of chroma sub-blocks regardless of the color format.

By selectively performing averaging of motion vectors of luma sub-blocks based on color format, the example techniques described in this disclosure may promote processing efficiency as well as coding gains. For instance, by selectively not performing averaging of motion vectors for 4:4:4 color format, the video coder may save processing clock cycles that would have been expended in performing averaging.

Also, in some examples, utilizing a motion vector of a luma sub-block for determining a motion vector of a chroma sub-block rather than averaging motion vectors of luma sub-blocks for determining a motion vector of a chroma sub-block may result in better video coding. For instance, determining a motion vector of a chroma sub-block based only on the motion vector of a luma sub-block may result in a motion vector that identifies prediction samples having more similar values to the chroma sub-blocks than prediction samples identified by a motion vector of a chroma sub-block that is determined based on averaging of motion vectors of luma sub-blocks. Prediction samples having more similar values to the chroma sub-blocks may reduce the amount of information that needs to be signaled (e.g., smaller residual values).

The above is described with respect to affine mode as the coding mode of a block. However, the example techniques described in this disclosure may be extended to other coding modes as well. For instance, in intra block copy (IBC) mode, for 4:4:4 color format, a video coder may determine a motion vector for a chroma block based on a motion vector of a co-located luma block. However, for 4:2:2 or 4:2:0 color format, a video coder may determine a motion vector for a chroma block based on an average of motion vectors of two or more luma blocks.

As another example, in cross-component linear mode, a video coder determines a prediction block for a chroma block based on the luma block. For 4:2:2 or 4:2:0 color format, the video coder may downsample the luma block so that the prediction block for the chroma block can be the same size as the luma block. However, for 4:4:4 color format, since the size of the chroma block and the size of the luma block is the same, the video coder may not perform downsampling of the luma block.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, uncoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including desktop computers, notebook (i.e., laptop) computers, tablet computers, set-top boxes, telephone handsets such smartphones, televisions, cameras, display devices, digital media players, video gaming consoles, video streaming device, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for motion vector derivation for one or more blocks of a first color component based on motion vectors for one or more blocks of a second color component, where the one or more blocks of the second color component are co-located (also called collocated) with the one or more blocks of the first color component. For instance, as described above, video encoder 200 and video decoder 300 may be configured to determine a motion vector for each chroma sub-block based on a motion vector for each luma sub-block, such as in examples where 4:4:4 color format is used and a coding mode for a block is affine mode.

Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than including an integrated display device.

System 100 as shown in FIG. 1 is merely one example. In general, any digital video encoding and/or decoding device may perform techniques for motion vector derivation in accordance with the example techniques described in this disclosure. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, devices 102, 116 may operate in a substantially symmetrical manner such that each of devices 102, 116 include video encoding and decoding components. Hence, system 100 may support one-way or two-way video transmission between source device 102 and destination device 116, e.g., for video streaming, video playback, video broadcasting, or video telephony.

In general, video source 104 represents a source of video data (i.e., raw, uncoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some example, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may modulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video generated by source device 102. Destination device 116 may access stored video data from file server 114 via streaming or download. File server 114 may be any type of server device capable of storing encoded video data and transmitting that encoded video data to the destination device 116. File server 114 may represent a web server (e.g., for a website), a File Transfer Protocol (FTP) server, a content delivery network device, or a network attached storage (NAS) device. Destination device 116 may access encoded video data from file server 114 through any standard data connection, including an Internet connection. This may include a wireless channel (e.g., a Wi-Fi connection), a wired connection (e.g., DSL, cable modem, etc.), or a combination of both that is suitable for accessing encoded video data stored on file server 114. File server 114 and input interface 122 may be configured to operate according to a streaming transmission protocol, a download transmission protocol, or a combination thereof.

Output interface 108 and input interface 122 may represent wireless transmitters/receiver, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., storage device 112, file server 114, or the like). The encoded video bitstream computer-readable medium 110 may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a cathode ray tube (CRT), a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream. If applicable, MUX-DEMUX units may conform to the ITU H.223 multiplexer protocol, or other protocols such as the user datagram protocol (UDP).

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as the Joint Exploration Test Model (JEM) or ITU-T H.266, also referred to as Versatile Video Coding (VVC). A recent draft of the VVC standard is described in Bross, et al. "Versatile Video Coding (Draft 4)," Joint Video Experts Team (JVET) of ITU-T SG 16 WP 3 and ISO/IEC JTC 1/SC 29/WG 11, 13$^{th}$ Meeting: Marrakech, Mass., 9-18 Jan. 2019, JVET-M1001-v3 (hereinafter "VVC Draft 4"). A more recent draft of the VVC standard is described in Bross, et al. "Versatile Video Coding (Draft 8)," Joint Video Experts Team (JVET) of ITU-T SG 16 WP 3 and ISO/IEC JTC 1/SC 29/WG 11, 17$^{th}$ Meeting: Brussels, BE, 7-17 Jan. 2020, JVET-Q2001 (hereinafter "VVC Draft 8"). The techniques of this disclosure, however, are not limited to any particular coding standard.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to JEM or VVC. According to JEM or VVC, a video coder (such as video encoder 200) partitions a picture into a plurality of coding tree units (CTUs). Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree (QT) partition, a binary tree (BT)

partition, and one or more types of triple tree (TT) partitions. A triple tree partition is a partition where a block is split into three sub-blocks. In some examples, a triple tree partition divides a block into three sub-blocks without dividing the original block through the center. The partitioning types in MTT (e.g., QT, BT, and TT), may be symmetrical or asymmetrical.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning per HEVC, QTBT partitioning, MTT partitioning, or other partitioning structures. For purposes of explanation, the description of the techniques of this disclosure is presented with respect to QTBT partitioning. However, it should be understood that the techniques of this disclosure may also be applied to video coders configured to use quadtree partitioning, or other types of partitioning as well.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of JEM and VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of JEM and VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the coefficients, providing further compression. By performing the quantization process, video encoder 200 may reduce the bit depth associated with some or all of the coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

In accordance with the techniques of this disclosure, a video coder (e.g., video encoder 200 or video decoder 300) may be configured to determine motion vector for a current block of a first color component based on motion vectors for one or more blocks of the second color component that are co-located with the current block. In some examples, the current block of the first color component and the one or more blocks of the second color component together form part of the same CU, and in such cases, may be considered as being co-located. For instance, the current block may be a chroma block and the one or more blocks of the second color component may be one or more luma blocks. In 4:2:0 color format, the luma component is four times the size of the chroma component. Therefore, four of the luma blocks and one chroma block together form a CU and can be considered co-located.

In some examples, the one or more blocks are co-located with the current block based on their relative locations in the picture. For instance, if the one or more blocks encompass the bottom-right portion of the current picture, then the current block encompasses the bottom-right portion of the current picture but may be of a smaller size due to the 4:2:0 color format.

As described above, in 4:4:4 color format, there may a one-to-one correlation between luma blocks and chroma blocks. For instance, for every one luma block there is one chroma block. In 4:2:2 color format, the luma component is double in size of the chroma component. Accordingly, there may be two luma blocks for every chroma block in the 4:2:2 color format. These are also examples of luma blocks and chroma blocks being co-located. Examples of co-located (also called collocated) chroma and luma blocks is illustrated in FIGS. 6-9.

In one or more examples, video encoder 200 and video decoder 300 may utilize different procedures to determine motion vectors for chroma blocks from motion vectors of luma blocks based on the color format. For instance, as described above and described in further detail below, affine mode is one example of a coding mode. In affine mode, the luma block of the CU and the chroma block of the CU are divided (e.g., partitioned) into sub-blocks of the luma block (i.e., luma sub-blocks) and sub-blocks of the chroma block (i.e., chroma sub-blocks). Video encoder 200 and video decoder 300 may determine motion vectors for the luma sub-blocks based on control point motion vectors described in more detail below.

In accordance with techniques described in this disclosure, video encoder 200 and video decoder 300 may determine a motion vector of a chroma sub-block based only on a motion vector of a co-located luma sub-block if the color format is 4:4:4. However, if the color format is not 4:4:4 (e.g., 4:2:0 or 4:2:2), then video encoder 200 and video decoder 300 may determine a motion vector for a chroma sub-block based on an average of motion vectors of two or more co-located luma sub-blocks.

In one example, a video coder (e.g., video encoder 200 or video decoder 300) may determine that a coding mode for a coding unit (CU) is affine mode and determine that a color format of the CU that includes a luma block and a chroma block is 4:4:4 color format. The video coder may determine a motion vector for each sub-block of the luma block based on control point motion vectors for the CU, and determine a motion vector for each sub-block of the chroma block based only on the motion vector of each co-located sub-block of the luma block.

The video coder may code the CU based on the motion vector for each sub-block of the luma block and the motion vector for each sub-block of the chroma block. For example, video decoder 300 may reconstruct the CU based on the motion vector for each sub-block of the luma block and the motion vector for each sub-block of the chroma block, and video encoder 200 may encode the CU based on the motion vector for each sub-block of the luma block and the motion vector for each sub-block of the chroma block.

However, if the color format is not 4:4:4, the video coder may perform averaging of motion vectors of luma sub-blocks. For example, a video coder may determine that a coding mode for a CU is affine mode and determine that a color format of a CU that includes a luma block and a chroma block is 4:2:2 or 4:2:0 color format. Similar to above where the color format is 4:4:4, the video coder may determine a motion vector for each sub-block of the luma block based on control point motion vectors for the CU. However, unlike the example where the color format is 4:4:4, the video coder may determine a motion vector for each sub-block of the chroma block based on an average of motion vectors of two or more co-located sub-blocks of the luma block. Similar to above, the video coder may code the CU based on the motion vector for each sub-block of the luma block and the motion vector for each sub-block of the chroma block.

This disclosure may generally refer to "signaling" certain information, such as syntax elements. The term "signaling" may generally refer to the communication of values syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

Figure 2A:
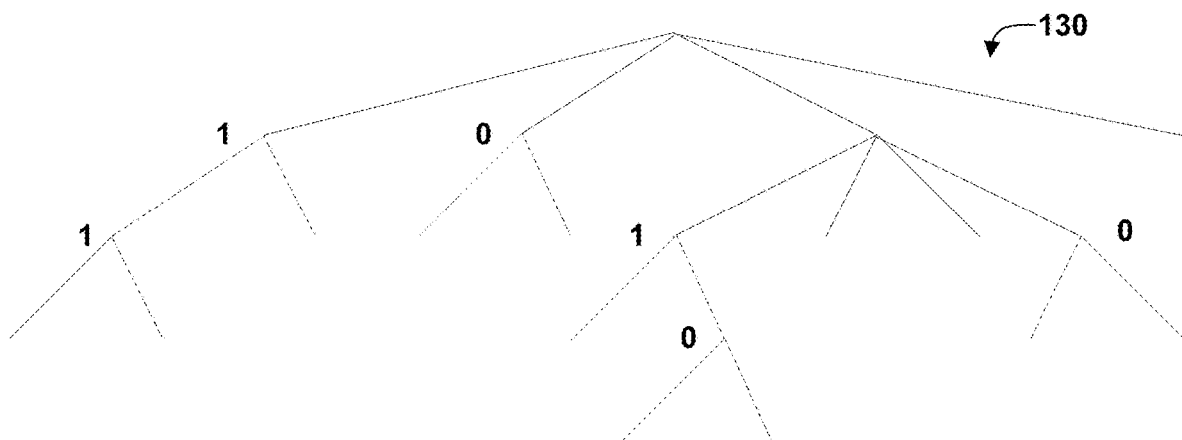
FIGS. 2A and 2B are conceptual diagrams illustrating an example quadtree binary tree (QTBT) structure, and a corresponding coding tree unit (CTU).
Figure 2B:
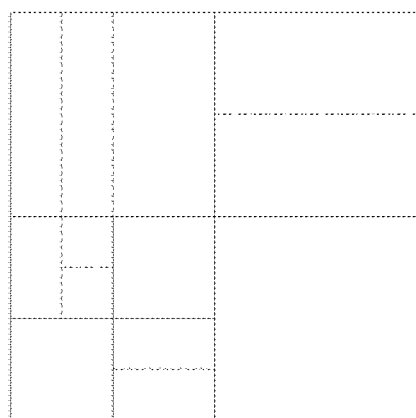

FIGS. 2A and 2B are conceptual diagram illustrating an example quadtree binary tree (QTBT) structure 130, and a corresponding coding tree unit (CTU) 132. The solid lines represent quadtree splitting, and dotted lines indicate binary tree splitting. In each split (i.e., non-leaf) node of the binary tree, one flag is signaled to indicate which splitting type (i.e., horizontal or vertical) is used, where 0 indicates horizontal splitting and 1 indicates vertical splitting in this example. For the quadtree splitting, there is no need to indicate the splitting type, since quadtree nodes split a block horizontally and vertically into 4 sub-blocks with equal size. Accordingly, video encoder 200 may encode, and video decoder 300 may decode, syntax elements (such as splitting information) for a region tree level of QTBT structure 130 (i.e., the solid lines) and syntax elements (such as splitting information) for a prediction tree level of QTBT structure 130 (i.e., the dashed lines). Video encoder 200 may encode, and video decoder 300 may decode, video data, such as prediction and transform data, for CUs represented by terminal leaf nodes of QTBT structure 130.

In general, CTU 132 of FIG. 2B may be associated with parameters defining sizes of blocks corresponding to nodes of QTBT structure 130 at the first and second levels. These parameters may include a CTU size (representing a size of CTU 132 in samples), a minimum quadtree size (MinQTSize, representing a minimum allowed quadtree leaf node size), a maximum binary tree size (MaxBTSize, representing a maximum allowed binary tree root node size), a maximum binary tree depth (MaxBTDepth, representing a maximum allowed binary tree depth), and a minimum binary tree size (MinBTSize, representing the minimum allowed binary tree leaf node size).

The root node of a QTBT structure corresponding to a CTU may have four child nodes at the first level of the QTBT structure, each of which may be partitioned according to quadtree partitioning. That is, nodes of the first level are either leaf nodes (having no child nodes) or have four child nodes. The example of QTBT structure 130 represents such nodes as including the parent node and child nodes having solid lines for branches. If nodes of the first level are not larger than the maximum allowed binary tree root node size (MaxBTSize), they can be further partitioned by respective binary trees. The binary tree splitting of one node can be iterated until the nodes resulting from the split reach the minimum allowed binary tree leaf node size (MinBTSize) or the maximum allowed binary tree depth (MaxBTDepth). The example of QTBT structure 130 represents such nodes as having dashed lines for branches. The binary tree leaf node is referred to as a coding unit (CU), which is used for prediction (e.g., intra-picture or inter-picture prediction) and transform, without any further partitioning. As discussed above, CUs may also be referred to as "video blocks" or "blocks."

In one example of the QTBT partitioning structure, the CTU size is set as 128×128 (luma samples and two corresponding 64×64 chroma samples), the MinQTSize is set as 16×16, the MaxBTSize is set as 64×64, the MinBTSize (for both width and height) is set as 4, and the MaxBTDepth is set as 4. The quadtree partitioning is applied to the CTU first to generate quad-tree leaf nodes. The quadtree leaf nodes may have a size from 16×16 (i.e., the MinQTSize) to 128×128 (i.e., the CTU size). If the leaf quadtree node is 128×128, it will not be further split by the binary tree, since the size exceeds the MaxBTSize (i.e., 64×64, in this example). Otherwise, the leaf quadtree node will be further partitioned by the binary tree. Therefore, the quadtree leaf node is also the root node for the binary tree and has the binary tree depth as 0. When the binary tree depth reaches MaxBTDepth (4, in this example), no further splitting is permitted. When the binary tree node has width equal to MinBTSize (4, in this example), it implies no further horizontal splitting is permitted. Similarly, a binary tree node having a height equal to MinBTSize implies no further vertical splitting is permitted for that binary tree node. As noted above, leaf nodes of the binary tree are referred to as CUs and are further processed according to prediction and transform without further partitioning.

The following describes affine motion model. An affine motion model can be described as:

$$\begin{cases} v_x = ax + by + e \\ v_y = cx + dy + f \end{cases} \quad 1)$$

Figure 3:
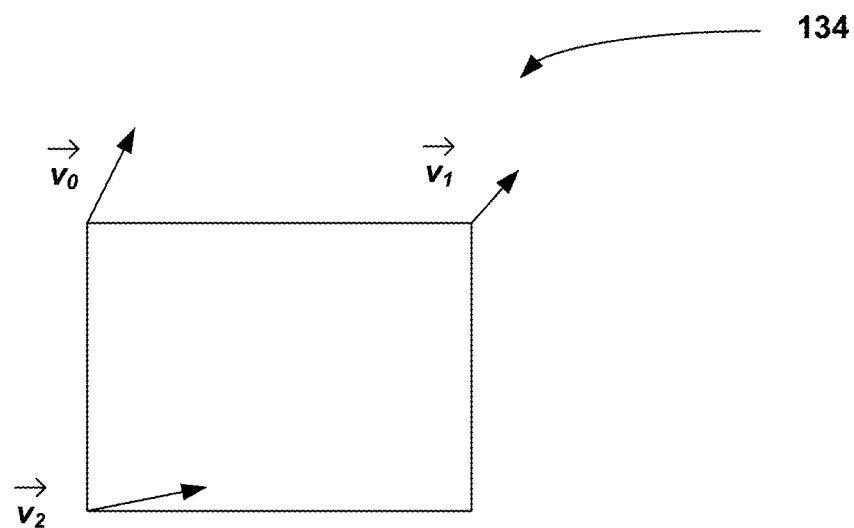
FIG. 3 is a conceptual diagram illustrating an example of a block having three control points and three control point motion vectors (CPMVs).

In equation 1), where $(v_x, v_y)$ is the motion vector at the coordinate $(x, y)$, and a, b, c, d, e, and f are the six parameters. This example affine motion model is referred to as a 6-parameters affine motion model. In a video coder, a picture is partitioned into blocks for block-based coding. The affine motion model for a block can also be described by the three motion vectors (MVs) $\vec{v}_0 = (v_{0x}, v_{0y})$, $\vec{v}_1 = (v_{1x}, v_{1y})$, and $\vec{v}_2 = (v_{2x}, v_{2y})$ at the different locations that are not in the same line. The three locations are usually referred to as control-points, the three motion vectors are referred to as control-point motion vectors (CPMVs). In the case when the three control-points are at the three corners of the block 134 (e.g., a CU) as shown in FIG. 3, the affine motion can be described as:

$$\begin{cases} v_x = \frac{(v_{1x} - v_{0x})}{blkW}x + \frac{(v_{2x} - v_{0x})}{blkH}y + v_{0x} \\ v_y = \frac{(v_{1y} - v_{0y})}{blkW}x + \frac{(v_{2y} - v_{0y})}{blkH}y + v_{0y} \end{cases} \quad 2)$$

In equation 2, blkW and blkH are the width and height of the block (e.g., CU).

Figure 4:
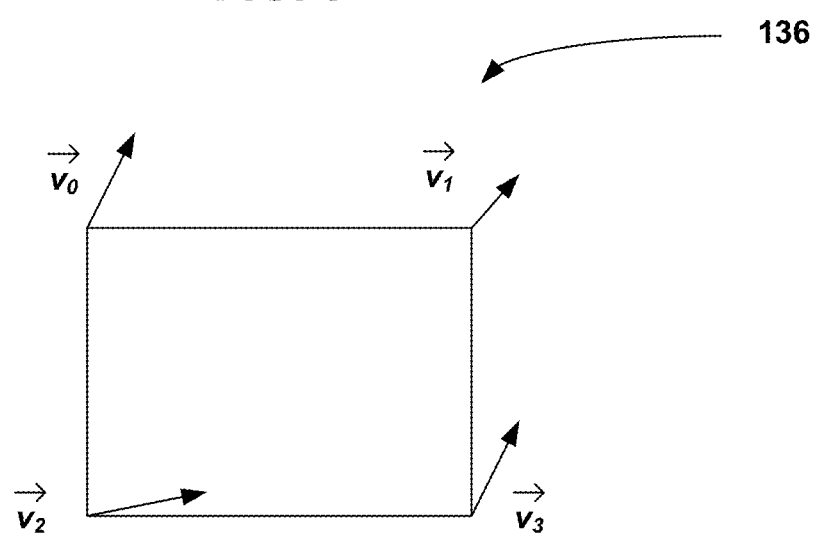
FIG. 4 is a conceptual diagram illustrating an example of a block having four control points and four CPMVs.

A simplified 4-parameters affine model (for zoom and rotational motion) is illustrated in FIG. 4 and described as:

$$\begin{cases} v_x = ax - by + e \\ v_y = bx + ay + f \end{cases} \quad 3)$$

Similarly, the simplified 4-parameters affine model for block 136 can be described by two CPMVs $\vec{v}_0 = (v_{0x}, v_{0y})$ and $\vec{v}_1 = (v_{1x}, v_{1y})$ at the two corners of the block (e.g., CU). The motion field is then described as:

$$\begin{cases} v_x = \frac{(v_{1x} - v_{0x})}{blkW} x - \frac{(v_{1y} - v_{0y})}{blkH} y + v_{0x} \\ v_y = \frac{(v_{1y} - v_{0y})}{blkW} x + \frac{(v_{1x} - v_{0x})}{blkH} y + v_{0y} \end{cases} \quad 4)$$

The following describes sub-block based affine motion compensation. Given an affine motion model for a block (e.g., CU), different motion vectors can be derived for each pixel in the block. Therefore, motion compensation can be performed pixel-by-pixel. However, to reduce the complexity, sub-block based motion compensation is usually adopted. In sub-block based motion compensation, the block is partitioned into multiple sub-blocks (that have smaller block size) and each sub-block is associate with one motion vector for motion compensation.

Figure 5:
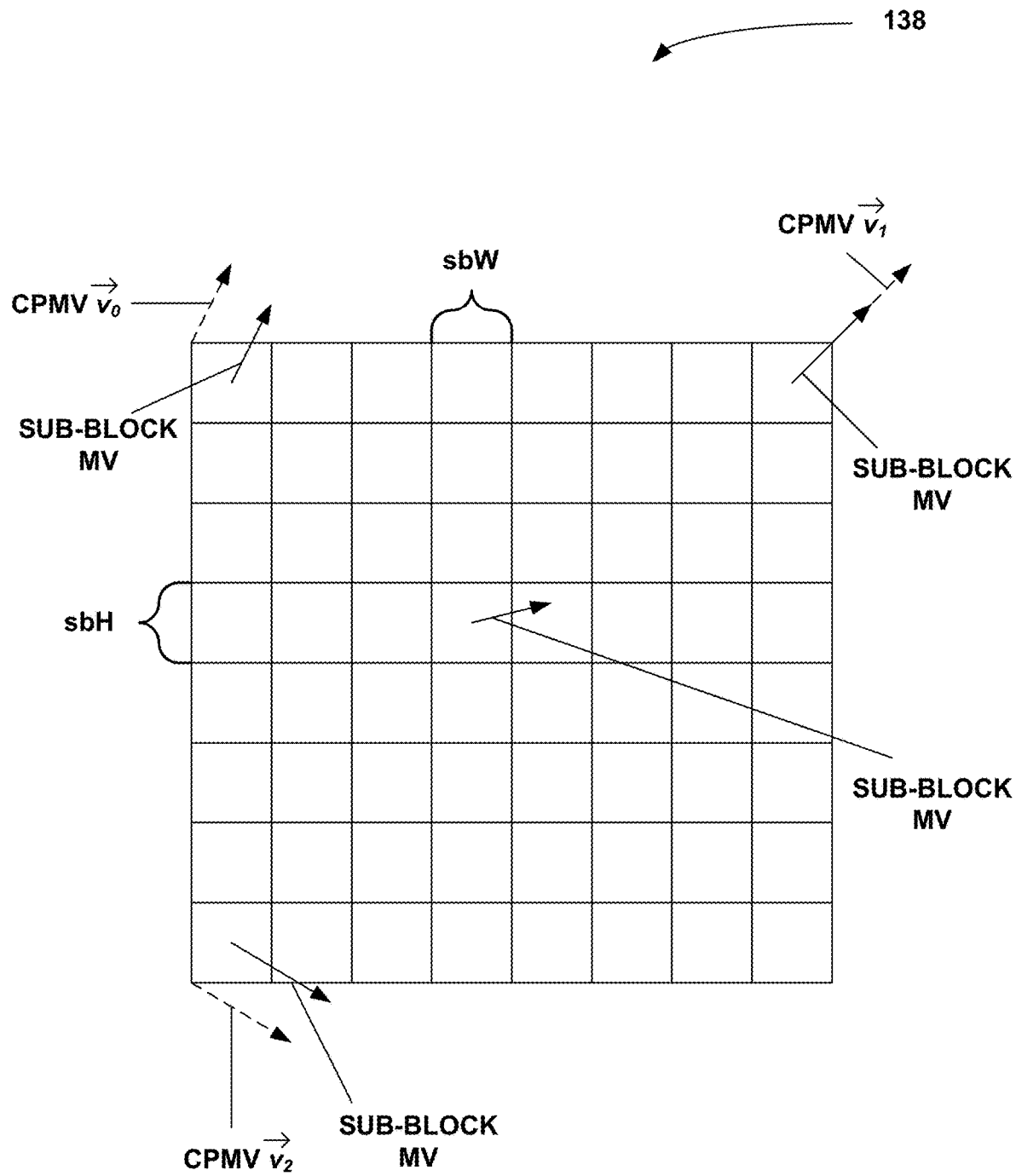
FIG. 5 is a conceptual diagram illustrating an example of CPMVs and sub-block motion vectors.

For instance, FIG. 5 is a conceptual diagram illustrating an example of CPMVs and sub-block motion vectors for block 138. Block 138 is partitioned into 64 sub-blocks. For each sub-block, video encoder 200 and video decoder 300 may determine a sub-block motion vector using equation 5 below. For example, the sub-block motion vectors, as illustrated in FIG. 5, may be based on the corner point motion vectors (e.g., CPMV $v_0$, CPMV $v_1$, and CPMV $v_2$, the width of the sub-block (e.g., sbW), and the height of the sub-block (e.g., sbH), as illustrated in FIG. 5.

As described above, a CU may include a luma block with luma components and two chroma blocks with chroma components. If the coding mode for the CU is affine mode, then the luma block of the CU may be partitioned (e.g., divided) into plurality of sub-blocks of the luma block (i.e., luma sub-blocks) and the chroma block of the CU may be partitioned into plurality of sub-blocks of the chroma block (i.e., chroma sub-blocks). For instance, block 138 may be considered as a luma block or a chroma block that is partitioned into plurality of sub-blocks (e.g., 64 sub-blocks).

The motion vector for each sub-block (e.g., of a luma block) is derived using the representative coordinate of the sub-block. Typically, the center position is used. For example, as illustrated in FIG. 5, the example sub-block motion vectors start from a center of respective sub-blocks. In one example, the luma block is partitioned into non-overlapping luma sub-blocks, and the chroma block is partitioned into non-overlapping chroma sub-blocks. The block width is blkW, block height is blkH, the sub-block width is sbW and sub-block height is sbH, as illustrated in FIG. 5, then there are blkH/sbH rows of sub-blocks and blkW/sbW sub-blocks in each row. For a six parameter affine motion model, the motion vector for the sub-block (referred to as sub-block MV) at $i_{th}$ row ($0<=i<blkW/sbW$) and $j_{th}$ ($0<=j<blkH/sbH$) column is derived as $$\begin{cases} v_x = \frac{(v_{1x} - v_{0x})}{blkW}\left(j*sbW + \frac{sbW}{2}\right) + \frac{(v_{2x} - v_{0x})}{blkH}\left(i*sbH + \frac{sbH}{2}\right) + v_{0x} \\ v_y = \frac{(v_{1y} - v_{0y})}{blkW}\left(j*sbW + \frac{sbW}{2}\right) + \frac{(v_{2y} - v_{0y})}{blkH}\left(i*sbH + \frac{sbH}{2}\right) + v_{0y} \end{cases} \quad 5)$$

Note that the CPMVs $\vec{v}_i$, i=0,1,2 may be different from any of the sub-block MVs, as shown in FIG. 5. Therefore, two types of MV buffers may be used for affine motion model. One is the CPMV (control point motion vector) buffer which stores the CPMVs, and the other is the sub-block MV (motion vector) buffer which stores the sub-block MVs. Typically, the sub-block MV buffer is the same as for normal usage of motion vectors, such as where the motion vectors are used for motion compensation, deblocking, normal motion vector prediction, etc. The CPMV buffer is an additional buffer to store the affine CPMVs.

Figure 6:
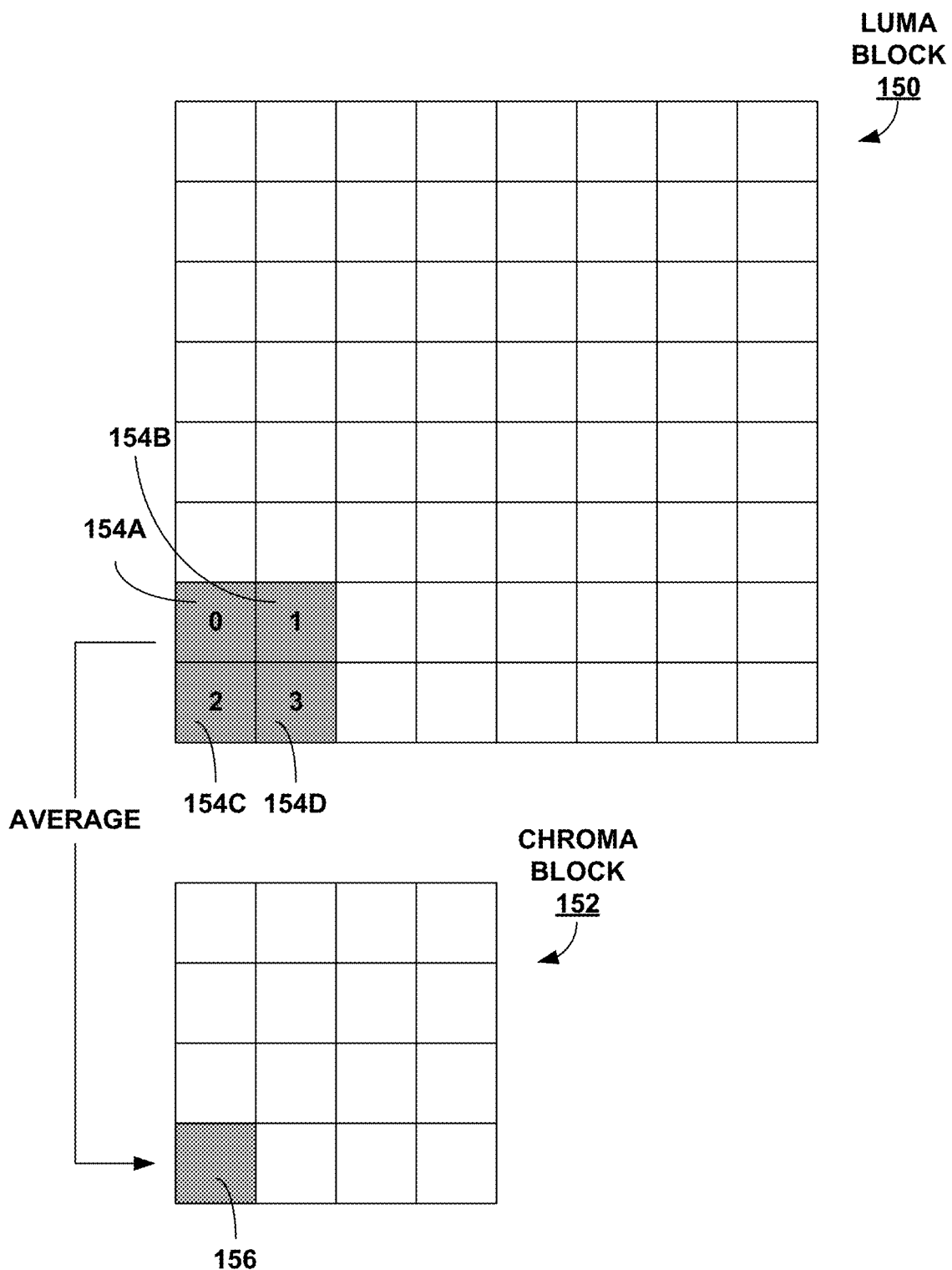
FIG. 6 is a conceptual diagram illustrating an example of determining a motion vector for a chroma block in 4:2:0 color format based on motion vectors from co-located luma blocks.

The following describes motion vector derivation of chroma components. In some examples, the motion vectors (MVs) of a chroma block are derived based on the MVs of the co-located luma blocks. As shown in FIG. 6, in the case of YUV4:2:0 color format, one chroma 4×4 sub-block corresponds to (e.g., is co-located with) four luma 4×4 blocks, and the MV of the chroma 4×4 block is the average MV of the four luma 4×4 blocks.

For example, FIG. 6 illustrates luma block 150 and chroma block 152. Luma block 150 and chroma block 152 may be part of the same CU with color format of 4:2:0. Luma block 150 is partitioned into plurality of sub-blocks including luma sub-blocks 154A-154D. Due to the 4:2:0 color format, for every one chroma sub-block there are four co-located luma sub-blocks. For instance, chroma block 152 is partitioned into plurality of sub-blocks including chroma sub-block 156 that is co-located with luma sub-blocks 154A-154D. In some techniques, video encoder 200 and video decoder 300 may determine the motion vector for chroma sub-block 156 based on an average of the motion vectors of the luma sub-blocks 154A-154D.

Figure 7:
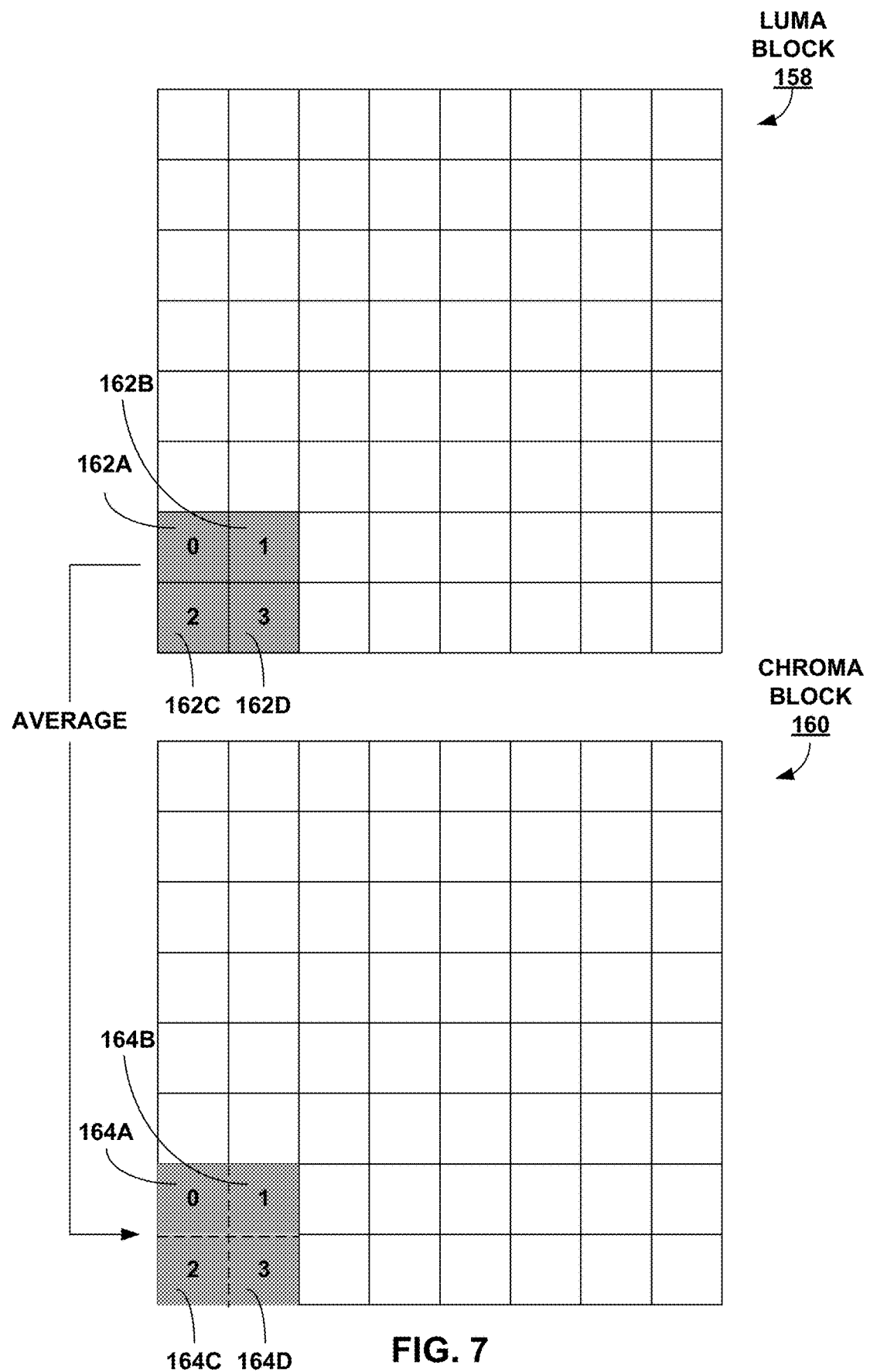
FIG. 7 is a conceptual diagram illustrating an example of determining motion vectors for four chroma blocks in 4:4:4 color format based on motion vectors from co-located luma blocks.

For the format of YUV4:4:4 or other format where luma and chroma components have same size, the MV of chroma blocks are derived as shown in FIG. 7. For example, as illustrated in FIG. 7, luma block 158 and chroma block 160 may be of the same CU, and the coding mode for the CU may be affine mode and the color format for luma block 158 and chroma block 160 may be 4:4:4. Luma block 158 includes luma sub-blocks 162A-162D and chroma block 160 includes chroma sub-blocks 164A-164D. Each one of luma sub-blocks 162A-162D is co-located with a respective one of chroma sub-blocks 164A-164D. For example, luma sub-block 162A is co-located with chroma sub-block 164A because luma sub-block 162A and chroma sub-block 164A encompass the same portion of the picture and are located in same relative positions in luma block 158 and chroma block 160, respectively. Luma sub-block 162B is co-located with chroma sub-block 164B because luma sub-block 162B and chroma sub-block 164B encompass the same portion of the picture and are located in same relative positions in luma block 158 and chroma block 160, respectively, and so forth.

In the example of FIG. 7, video encoder 200 or video decoder 300 may average the motion vectors for luma sub-blocks 162A-162D to generate an averaged motion vector, and each one of chroma sub-blocks 164A-164D would share the averaged motion vector. For example, if each of chroma sub-blocks 164A-164D were 4×4 sub-blocks, then, in this case, the smallest block size that share a same MV is 8×8 (e.g., the combination of chroma sub-blocks 164A-164D forms an 8×8 chroma sub-block). The 8×8 block that contains the four Chroma 4×4 blocks (i.e., 0, 1, 2, and 3 shown as chroma sub-blocks 164A-164D) uses the average MV of corresponding luma block 0, 1, 2 and 3 shown as luma sub-blocks 162A-162D, as shown in FIG. 7.

The following describes intra block copy (BC) mode. Intra block copy (Intra BC) is a technique by which sample values are predicted from other samples in the same picture by a displacement vector called a block vector, in a manner conceptually similar to motion-compensated prediction. For example, video encoder 200 and video decoder 300 may determine a block vector a current block in a current picture, where the block vector identifies a reference block in the same current picture. In VVC, block vectors of chroma components, are also derived from the block vectors of the luma component. For instance, video encoder 200 and video decoder 300 may determine a block vector for a luma block of a CU and the block vector for the chroma block of the CU is based on the block vector for the luma block.

The following describes CCLM mode (cross-component linear model prediction mode). Cross-component linear model (CCLM) prediction mode is used in VVC to reduce the cross-component redundancy. In CCLM mode, the chroma samples are predicted based on the reconstructed luma samples of the same CU by using a linear model as follows:

$$\text{pred}_C(i,j) = \alpha \cdot \text{rec}_L'(i,j) + \beta \quad \quad 6)$$

In equation (6), $\text{pred}_C(i, j)$ is the prediction pixel value of the chroma sample at the position (i,j), and $\text{rec}_L'(i, j)$ is a value derived from reconstructed luma sample of the same CU. For example, in CCLM, for 4:2:2 or 4:2:0 color format, video encoder 200 and video decoder 300 may downsample a luma block to generate $\text{rec}_L'$. Parameters $\alpha$ and $\beta$ in equation (6) may be derived by minimizing regression error between the neighboring reconstructed luma and chroma samples around the current block.

$$E(\alpha, \beta) = \sum_i (y_i - (\alpha \cdot x_i + \beta))^2 \quad \quad 7)$$

And the parameters $\alpha$ and $\beta$ are solved as follows $$\alpha = \frac{I \sum x_i \cdot y_i - \sum x_i \cdot \sum y_i}{I \sum x_i \cdot x_i - \sum x_i \cdot \sum x_i} \quad \quad 8)$$

$$\beta = \left( \sum y_i - \alpha \cdot \sum x_i \right) / I \quad \quad 9)$$

where $x_i$ is downsampled reconstructed Luma reference samples, $y_i$ is reconstructed Chroma reference samples, and I is the amount of the reference samples.

There may be technical problems associated with some of these techniques for motion vector derivation of chroma sub-blocks or determining $\text{pred}_c(i,j)$. This disclosure describes example techniques that provide technical solutions with practical applications.

For instance, as shown in the description of motion vector derivation of chroma component, when the color format is YUV 4:4:4, the way to derive chroma MV in the one of the VVC draft specifications decreased the accuracy of chroma MVs and introduced extra complexity (calculating the average MV of 4 luma MVs). In this disclosure, example techniques to derive motion vector of one color component from another color component (e.g., deriving chroma motion vectors from luma component for YUV format, etc.) are described. The MV of a derive-to component block (e.g., current block of first color component) is derived based on the MV(s) of collocated derive-from component block(s) (e.g., one or more blocks of a second color component, where the current block of the first color component and the one or more blocks of the second color component are co-located).

For each derive-to block (e.g., block for which the motion vector is being determined), if there is one collocated derive-from block (e.g., block from which a motion vector is used to determine motion vector for derive-to block), the MV of the derive-to block may be derived based on the MV of the collocated derive-from block (for example, reuse the collocated motion vector). If each derive-to block has more than one collocated derive-from blocks, the MV of the derive-to block may be derived based on the MVs of collocated derive-from blocks.

Stated another way, assume that a color format of a CU is 4:4:4. In this example, video encoder 200 and video decoder 300 may determine a motion vector or motion vectors (e.g., for affine mode or bi-prediction) for a luma block. Then, video encoder 200 and video decoder 300 may determine a motion vector or motion vectors (e.g., for affine mode or bi-prediction) for a chroma block based on the motion vector or motion vectors for a co-located luma block, without any averaging from multiple blocks. However, for color formats other than 4:4:4, one chroma block may be co-located with multiple luma blocks. For instance, in FIG. 6, chroma sub-block 156 is co-located with luma sub-blocks 154A-154D, where the color format is 4:2:0. In such cases, video encoder 200 and video decoder 300 may average motion vectors of the luma blocks that are co-located with the chroma block. Examples of where video encoder 200 and video decoder 300 may not average motion vectors of luma sub-blocks to determine motion vectors of chroma sub-blocks, and where video encoder 200 and video decoder 300 may average motion vectors of luma sub-blocks to determine motion vectors of chroma sub-blocks for the affine mode as described in more detail with respect to FIGS. 8 and 9.

The example techniques described in this disclosure can be applied to various coding tool that derives information from one component to another. For example, the techniques described in this disclosure may be applicable to the affine mode, intra BC mode, LM mode.

As described above, in some examples, video encoder 200 and video decoder 300 may average motion vectors of luma blocks or sub-blocks to derive motion vectors for chroma blocks or sub-blocks. There may be different ways of deriving one MV (e.g., for a chroma block or sub-block) from multiple co-located MVs (e.g., of co-located luma blocks or sub-blocks) may be applied. Some examples of the methods are:

Example 1. Calculate the weighted average motion vector of the N co-located derive-from motion vectors (e.g., motion vectors for luma blocks). $MV_{avg} = ((\sum_{i=0}^{N-1} w_i \cdot MV_i) + \text{offset})/D$. The values of the parameters can be derived based on rules predefined on both encoder and decoder sides or signaled from video encoder 200 to video decoder 300. For instance, the value of $w_i$, offset, and D may be signaled by video encoder 200 to video decoder 300, or video decoder 300 may determine the value of $w_i$, offset, and D based on implicit techniques that do not require video encoder 200 to signal to video decoder 300.

Example 2. This example picks one of the co-located motion vectors based on rules predefined on both encoder and decoder sides or signaled from video encoder 200 to video decoder 300. Example 2 may be similar to example 1, with only one $w_i$ that has non-zero value and all other values of w equals to 0. For instance, rather than averaging the motion vectors of a plurality of co-located luma blocks or sub-blocks to determine the motion vector of a chroma block or sub-block, video encoder 200 and video decoder 300 may be preconfigured to select one of the motion vectors of the plurality of co-located luma blocks or sub-blocks and assign the chroma block or sub-block the selected motion vector (possibly with some scaling to address difference resolutions for motion vectors of luma blocks or sub-blocks and chroma blocks or sub-blocks).

The following are a few examples of the described techniques being applied to coding tools, such as where a coding mode for a CU is affine mode. For example, the following is an example for deriving MV for chroma component of YUV 4:4:4 format. That is, in some examples, video encoder 200 and video decoder 300 may determine that a coding mode for a CU is affine mode, and may determine that a color format of the CU that includes a luma block and a chroma block is 4:4:4 color format.

As an example, for YUV 4:4:4 color format, MVs of luma blocks are on a N×M (for example 4×4) block basis and each N×M (N and M are same for luma) chroma block has one collocated N×M luma block. In other words, for 4:4:4 color format, for every luma block or sub-block there is one, and only one, co-located chroma block. This is because the size of the luma block and the chroma block is the same in 4:4:4 color format. Stated another way, a ratio of a height of the luma block to a height of the chroma block is equal to 1, and a ratio of a width of the luma block to a width of the luma block is equal to 1.

Figure 8:
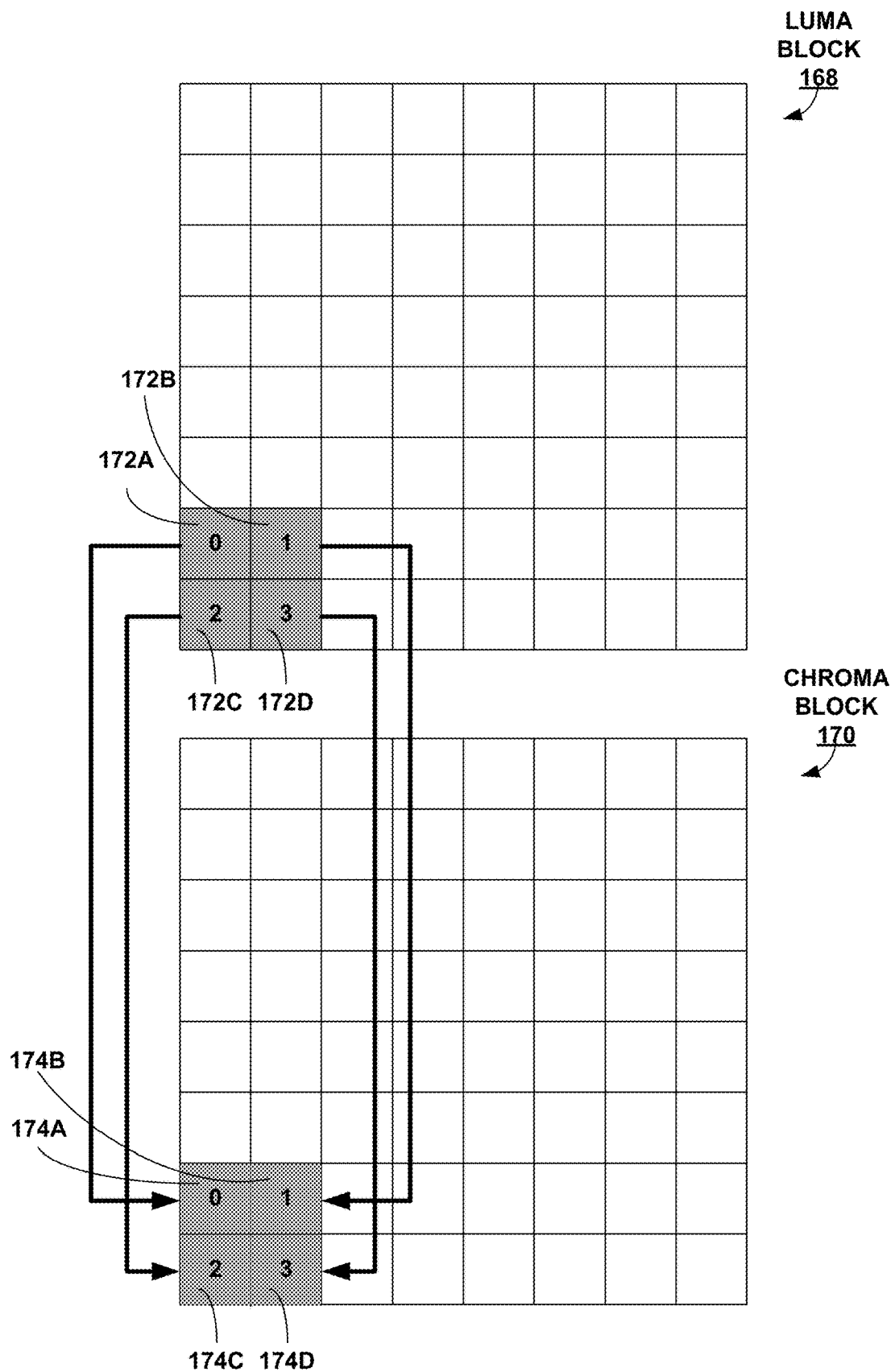
FIG. 8 is a conceptual diagram illustrating an example of determining motion vectors for four chroma blocks in 4:4:4 color format based on motion vectors from respective co-located luma blocks.

The MV of the collocated N×M luma block is reused for the current chroma N×M block. As shown in FIG. 8, the chroma block 0, 1, 2, 3 use the motion vectors of chroma block 0, 1, 2, 3, respectively. This example may be applied to affine mode and Intra BC mode, as a few examples.

For instance, assume that FIG. 8 illustrates an example of a coding mode of a CU being affine mode, and the CU includes luma block 168 and chroma block 170. In this example, assume that the color format for luma block 168 and chroma block 170 is 4:4:4. Accordingly, the size of luma block 168 and chroma block 170 is the same (e.g., a ratio of a height of the luma block to a height of the chroma block is equal to 1, and a ratio of a width of the luma block to a width of the chroma block is equal to 1). As illustrated, luma block 168 includes luma sub-blocks 172A-172D of luma block 168. Chroma block 170 includes chroma sub-blocks 174A-174D of chroma block 170. In some examples, the size of luma sub-blocks 172A-172D and the size of chroma sub-blocks 174A-174D may be 4×4.

Video encoder 200 and video decoder 300 may each determine motion vectors for luma sub-blocks 172A-172D. For instance, video encoder 200 may assign control point motion vectors to luma block 168, similar to FIGS. 3-5, and signal information indicative of the control point motion vectors for luma block 168 to video decoder 300. Video encoder 200 and video decoder 300 may each utilize the control point motion vectors to determine motion vectors for the luma sub-blocks of luma block 168, including motion vectors for luma sub-blocks 172A-172D, such as described above with respect to equation 5 above.

In accordance with one or more examples, video encoder 200 and video decoder 300 may determine a motion vector for each sub-block of chroma block 170, including chroma sub-blocks 174A-174D, based only on the motion vector of each co-located sub-block of luma block 168. For example, because the color format is 4:4:4, for each one of chroma sub-blocks 174A-174D, there is only one co-located luma sub-block. Chroma sub-block 174A is co-located with luma sub-block 172A, chroma sub-block 174B is co-located with luma sub-block 172B, and so forth.

In some examples, video encoder 200 and video decoder 300 may set the motion vector for each sub-block of chroma block 170 equal to the motion vector of each co-located sub-block of luma block 172. For example, video encoder 200 and video decoder 300 may set the motion vector of chroma sub-block 174A equal to the motion vector of luma sub-block 172A, set the motion vector of chroma sub-block 174B equal to the motion vector of luma sub-block 172B, and so forth. In some examples, rather than simply setting the motion vectors of chroma sub-blocks equal to motion vectors of luma sub-blocks, video encoder 200 and video decoder 300 may scale the motion vectors of the luma sub-blocks based on the motion vector resolution. For example, the fractional-sample accuracy of the motion vectors for luma sub-blocks 172A-172D may be 1/16, and the fractional-sample accuracy of the motion vectors for chroma sub-blocks 174A-174D may be 1/32. In such examples, video encoder 200 and video decoder 300 may scale the motion vectors of luma sub-blocks 172A-172D by 2 to determine the motion vectors of co-located chroma sub-blocks 174A-174D.

The above described the example of FIG. 8 with affine mode. The above example may be extended to other modes like intra block copy (IBC) mode as well. In IBC mode, rather than control point motion vectors and motion vectors for sub-blocks, block vectors may be utilized. For example, in IBC mode, if the picture is partitioned with dual tree on, then the luma components and the chroma components may be partitioned in different ways. That is, there may not be alignment between the luma blocks and chroma blocks. In such examples, rather than averaging motion vectors from luma blocks to determine a block vector for a chroma block, video encoder 200 and video decoder 300 may determine a block vector for the chroma block based on the block vector of only one luma block (e.g., the co-located luma block).

The following is an example for deriving MV for chroma component of YUV 4:2:2 format, but the example techniques are applicable to YCbCr or other color formats as well. As one example, for YUV 4:2:2 format, compared to the luma component, chroma components have half horizontal resolution and full vertical resolution. MVs of luma blocks are on a N×M (for example 4×4) block basis and each N×M (N and M are same as luma) chroma block has two co-located N×M luma block. To derive chroma block MVs, the average MV of the two co-located luma N×M blocks is used for a chroma 4×4 block, as illustrated in FIG. 9.

Figure 9:
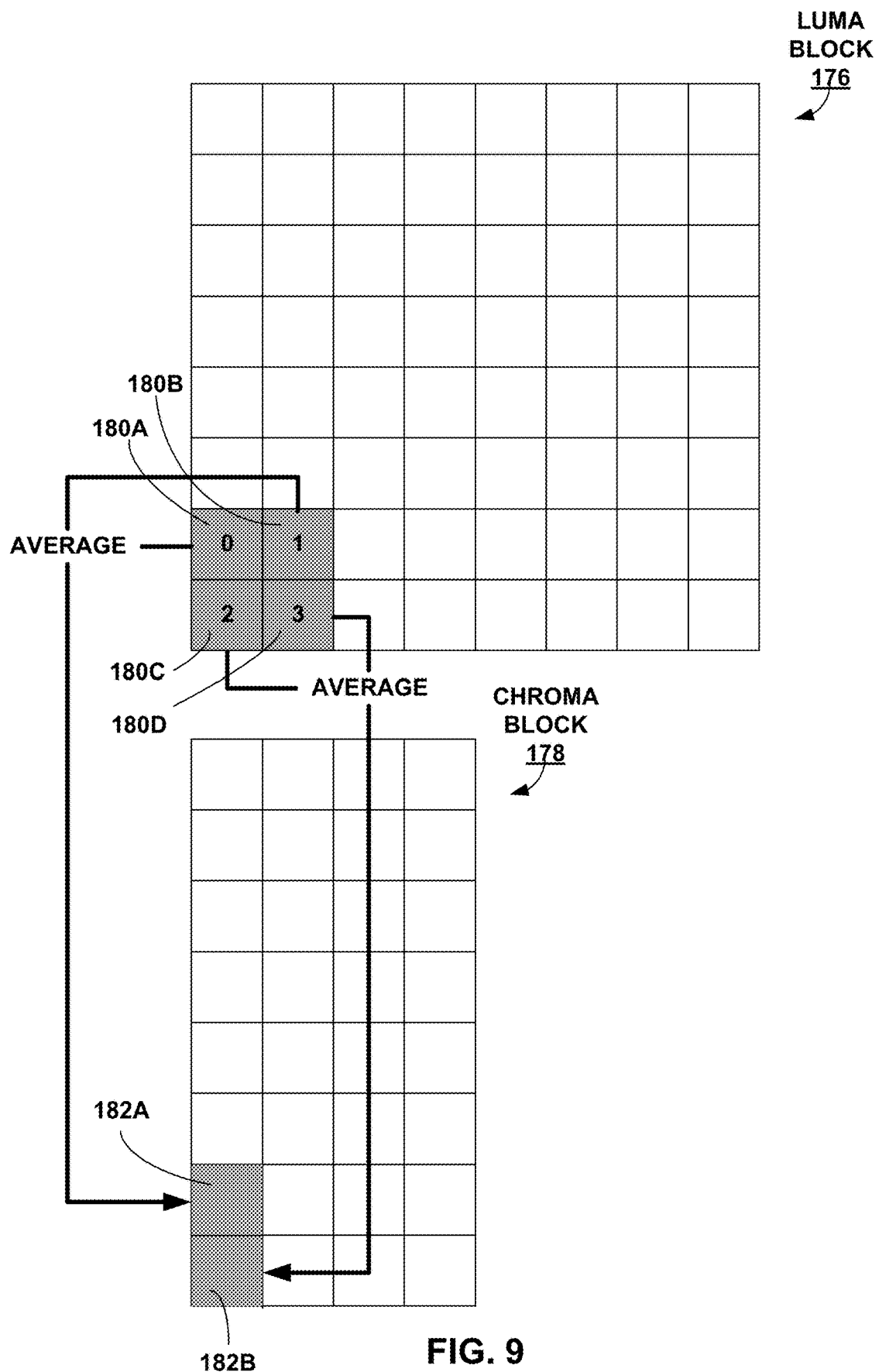
FIG. 9 is a conceptual diagram illustrating an example of determining motion vectors for two chroma blocks in 4:2:2 color format based on motion vectors from respective co-located luma blocks.

For instance, assume that FIG. 9 illustrates an example of a coding mode of a CU being affine mode, and the CU includes luma block 176 and chroma block 178. In this example, assume that the color format for luma block 176 and chroma block 178 is 4:2:2. Accordingly, the size of luma block 176 and chroma block 178 is the different (e.g., a ratio of a height of the luma block to a height of the chroma block is equal to 1, but a ratio of a width of the luma block to a width of the chroma block is equal to 2). As illustrated, luma block 176 includes luma sub-blocks 180A-180D of luma block 176. Chroma block 178 includes chroma sub-blocks 182A and 182B of chroma block 178. In some examples, the size of luma sub-blocks 180A-180D and the size of chroma sub-blocks 182A and 182B may be 4×4.

Video encoder 200 and video decoder 300 may each determine motion vectors for luma sub-blocks 180A-180D. For instance, video encoder 200 may assign control point motion vectors to luma block 176, similar to FIGS. 3-5, and signal information indicative of the control point motion vectors for luma block 176 to video decoder 300. Video encoder 200 and video decoder 300 may each utilize the control point motion vectors to determine motion vectors for the luma sub-blocks of luma block 176, including motion vectors for luma sub-blocks 180A-180D, such as described above with respect to equation 5 above.

In accordance with one or more examples, video encoder 200 and video decoder 300 may determine that a color format of the CU that includes luma block 176 and chroma block 178 is 4:2:2 or 4:2:0 (e.g., 4:2:2 in the example of FIG. 9). Video encoder 200 and video decoder 300 may determine a motion vector for each sub-block of chroma block 178, including chroma sub-blocks 182A and 182B, based on an average of motion vectors of two or more co-located sub-blocks of luma block 176. For example, because the color format is 4:2:2, for each one of chroma sub-blocks 182A and 182B, there are two co-located luma sub-blocks. For example, chroma sub-block 182A is co-located with luma sub-blocks 180A and 180B, and chroma sub-block 182B is co-located with luma sub-blocks 180C and 180D, and so forth.

In some examples, video encoder 200 and video decoder 300 may set the motion vector for each sub-block of chroma block 178 equal to the average of two or more motion vectors of co-located sub-blocks of luma block 176 (e.g., two co-located sub-blocks for 4:2:2 color format and four co-located sub-blocks for 4:2:0 color format).

For example, video encoder 200 and video decoder 300 may set the motion vector of chroma sub-block 182A equal to the average of the motion vector of luma sub-blocks 180A and 180B, and set the motion vector of chroma sub-block 182B equal to the average of the motion vector of luma sub-blocks 180C and 180D, and so forth. In some examples, video encoder 200 and video decoder 300 may perform a weighted average of the motion vectors, such as based on $MV_{avg} = ((\Sigma_{i=0}^{N-1} w_i \cdot MW_i) + \text{offset})/D$, where the values of $w_i$, offset, and D may be signaled or implicitly derived. In some examples, rather than simply setting the motion vectors of chroma sub-blocks equal to average or weighted average motion vectors of luma sub-blocks, video encoder 200 and video decoder 300 may scale the average or weighted average motion vectors of the luma sub-blocks based on the motion vector resolution, as described above.

The above described the example of FIG. 9 with affine mode. The above example may be extended to other modes like intra block copy (IBC) mode as well. In IBC mode, rather than control point motion vectors and motion vectors for sub-blocks, block vectors may be utilized. For example, in IBC mode, if the picture is partitioned with dual tree on, then the luma components and the chroma components may be partitioned in different ways. That is, there may not be alignment between the luma blocks and chroma blocks. In such examples, video encoder 200 and video decoder 300 may average motion vectors from luma blocks to determine a block vector for a chroma block.

In this manner, video encoder 200 and video decoder 300 may be configured to perform different operations for determining motion vectors or block vectors based on the color format. For instance, for 4:4:4 color format, video encoder 200 and video decoder 300 may not need to average motion or block vectors of co-located luma blocks or sub-blocks for determining motion or block vectors for chroma blocks or sub-blocks. However, if the color format is not 4:4:4, then video encoder 200 and video decoder 300 may average motion or block vectors or co-located luma blocks or sub-blocks for determining motion or block vectors for chroma blocks or sub-blocks.

One or more of the example techniques may be represented as follows. In the following, video encoder 200 and video decoder 300 may determine "mvAvgLX" which represents the motion vector that is to be used to determine the motion vector of a chroma sub-block. Although, mvAvgLX is the variable, it should be understood that with 4:4:4 color format, no averaging of motion vectors may be needed.

For example, if both SubWidthC (e.g., ratio of width of luma block to chroma block) and SubHeightC (e.g., ratio of width of luma block to chroma block) are equal to 1 (e.g., 4:4:4 color format), the following applies mvAvgLX=mvLX [xSbIdx][ySbIdx], which means that mvAvgLX is equal to the motion vector of a luma sub-block located at [xSbIdx] [ySbIdx] (i.e., without any averaging). Otherwise (e.g., color format is 4:2:2), the following applies
mvAvgLX=mvLX[(xSbIdx>>(SubWidthC−1)<<(Sub-WidthC−1))] [(ySbIdx>>(SubHeightC−1)<<(SubHeightC−1))]+mvLX[(xSbIdx>>(SubWidthC−1)<<(SubWidthC−1))+(SubWidthC−1)][(ySbIdx>>(SubHeightC−1)<< (SubHeightC−1))+(SubHeightC−1)]
mvAvgLX[0]=(mvAvgLX[0]+1−(mvAvgLX[0]>=0))>>1
mvAvgLX[1]=(mvAvgLX[1]+1−(mvAvgLX[1]>=0))>>1

The above means averaging motion vectors of two co-located luma sub-blocks to determine mvAvgLX.

Video encoder 200 and video decoder 300 may then set a motion vector of the co-located chroma sub-block equal to mvAvgLX. However, in some examples, video encoder 200 and video decoder 300 may scale mvAvgLX to compensate for fractional-sample accuracy. For example, the fractional-sample accuracy of the motion vectors for luma sub-blocks may be 1/16, and the fractional-sample accuracy of the motion vectors for chroma sub-blocks may be 1/32. In such examples, video encoder 200 and video decoder 300 may scale the motion vectors of luma sub-blocks by 2 for 4:4:4 color format to determine the motion vectors of co-located chroma sub-blocks. For 4:2:2, video encoder 200 and video decoder 300 may scale mvAvgLX by multiplying by 2 and dividing by the SubWidthC or SubHeightC.

The example techniques may also be used for CCLM mode. For example, the techniques may be used when deriving pixel value used for CCLM mode on YUV 4:4:4 format. When a CU is encoded with CCLM mode, for each chroma pixel at (i,j), a value $rec_L'(i, j)$ is needed to obtain a prediction pixel value $pred_C(i, j)$ based on linear model. The example techniques described in this disclosure may be applied to the derivation of the value $rec_L'(i, j)$. For video signal with YUV 4:4:4 format, each chroma pixel has one co-located luma pixel. In this example, the value of the co-located luma pixel is used as $rec_L'(i, j)$ to perform the linear-model based prediction for the chroma pixel.

Figure 10:
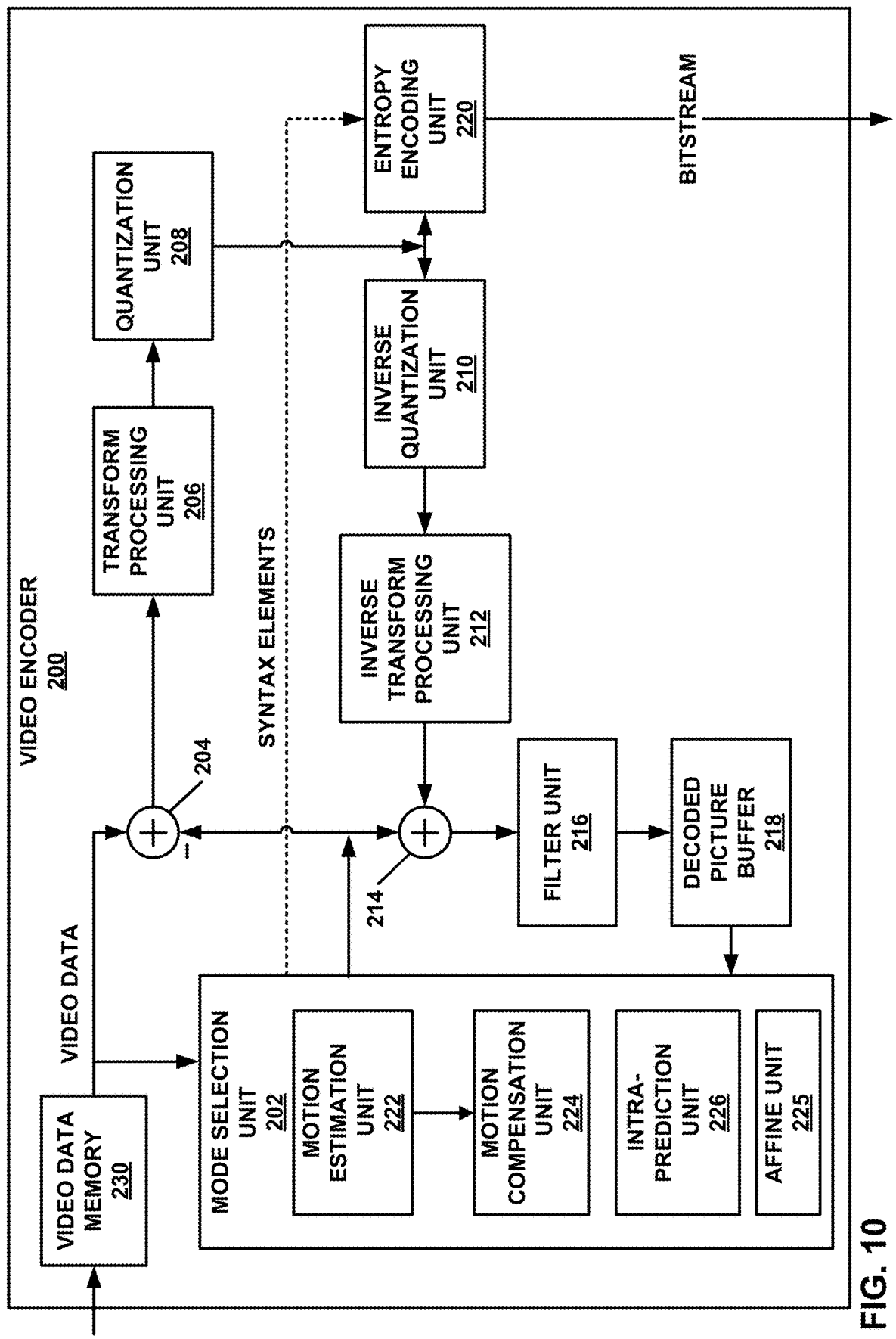
FIG. 10 is a block diagram illustrating an example video encoder that may perform the techniques of this disclosure.

FIG. 10 is a block diagram illustrating an example video encoder 200 that may perform the techniques of this disclosure. FIG. 10 is provided for purposes of explanation and should not be considered limiting of the techniques as broadly exemplified and described in this disclosure. For purposes of explanation, this disclosure describes video encoder 200 in the context of video coding standards such as the HEVC video coding standard and the H.266 video coding standard in development. However, the techniques of this disclosure are not limited to these video coding standards and are applicable generally to video encoding and decoding.

In the example of FIG. 10, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 10 are illustrated to assist with understanding the operations performed by video encoder 200. The units may be implemented as fixed-function circuits, programmable circuits, or a combination thereof. Fixed-function circuits refer to circuits that provide particular functionality and are preset on the operations that can be performed. Programmable circuits refer to circuits that can programmed to perform various tasks and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the object code of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit 225, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

For example, mode selection unit 202 may be configured to determine that a coding mode for a first CU is affine mode (e.g., CU that includes luma block 168 and chroma block 170). Mode selection unit 202 may also be configured to determine that color format for a first luma block (e.g., luma block 168) of the first CU and a first chroma block (e.g., chroma block 170) of the first CU is 4:4:4 color format (e.g., based on rate-distortion values). Similarly, mode selection unit 202 may be configured to determine that a coding mode for a second CU (e.g., CU that includes luma block 176) in a different picture than the first CU is affine mode. Mode selection unit 202 may also be configured to determine that color format for a second luma block (e.g., luma block 176) of the second CU and a second chroma block (e.g., chroma block 178) of the second CU is 4:2:2 or 4:2:0 color format (e.g., based on rate-distortion values).

Video encoder 200 may partition a picture retrieved from video data memory 230 into a series of CTUs and encapsulate one or more CTUs within a slice. Mode selection unit 202 may partition a CTU of the picture in accordance with a tree structure, such as the QTBT structure or the quad-tree structure of HEVC described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

In some examples, an affine unit 225, which may be part of motion estimation unit 222 and/or motion compensation unit 224 or a separate unit as illustrated, may be configured to determine control point motion vectors for the first CU (e.g., CU with 4:4:4 color format described above) and determine control point motion vectors for the second CU (e.g., CU with 4:2:2 or 4:2:0 color format described above). Affine unit 225 may be configured to determine a motion vector for each sub-block (e.g., luma sub-blocks 172A-172D) of the first luma block (e.g., luma block 168) based on control point motion vectors for the first CU and determine a motion vector for each sub-block (e.g., luma sub-blocks 180A-180D) of the second luma block (e.g., luma block 176) based on control point motion vectors for the second CU.

For the first CU (e.g., with 4:4:4 color format), affine unit 225 may determine a motion vector for each sub-block (e.g., chroma sub-blocks 174A-174D) of the chroma block (e.g., chroma block 170) based only on the motion vector of each co-located sub-block (e.g., luma sub-blocks 172A-172D) of the luma block (e.g., luma block 168). For example, affine unit 225 may set motion vectors for each of chroma sub-blocks 174A-174D equal to respective co-located luma sub-blocks 172A-172D, but there may be some scaling for fractional accuracy of the motion vectors.

For the second CU (e.g., with 4:2:2 or 4:2:0 color format), affine unit 225 may determine a motion vector for each sub-block (e.g., chroma sub-blocks 182A and 182B) of the second chroma block (e.g., chroma block 178) based on an average of motion vectors of two or more co-located sub-blocks (e.g., luma sub-blocks 180A-180D) of the second luma block (e.g., luma block 176). For instance, for 4:2:2 color format, affine unit 225 may determine, for each chroma sub-block 182A and 182B of chroma block 178, an average of motion vectors of two sub-blocks (e.g., luma sub-blocks 180A and 180B for chroma sub-block 182A and luma sub-blocks 180C and 180D for chroma sub-block 182B) of luma block 176. In some examples, for each sub-block (e.g., chroma sub-blocks 182A and 182B) of chroma block 178, the average of motion vectors of two sub-blocks (e.g., luma sub-blocks 180A and 180B for chroma sub-block 182A and luma sub-blocks 180C and 180D for chroma sub-block 182B) of luma block 176 may include determining, for each sub-block (e.g., chroma sub-blocks 182A and 182B) of chroma block 178, a weighted average of motion vectors of the two sub-blocks (e.g., luma sub-blocks 180A and 180B for chroma sub-block 182A and luma sub-blocks 180C and 180D for chroma sub-block 182B) of luma block 176.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

Mode selection unit 202 provides the prediction block to residual generation unit 204. Residual generation unit 204 receives a raw, uncoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit 202 does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as few examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

In this way, residual generation unit 204 may be considered as encoding luma blocks and chroma blocks. For example, affine unit 225 may determine first prediction samples for each luma sub-block 172A-172D of luma block 168 based on the motion vector for each luma sub-block 172A-172D of luma block 168 and second prediction samples for each chroma sub-block 174A-174D of chroma block 170 based on the motion vector for each chroma sub-block 174A-174D of chroma block 170. Residual generation unit 204 may determine residual samples based on differences between the first prediction samples and samples of luma block 168 and differences between the second prediction samples and samples of chroma block 170. As described below, entropy encoding unit 220 may then signal information indicative of the residual samples. Affine unit 225 and residual generation unit 204 may perform similar operations for luma block 176 and chroma block 178 (e.g., CU in 4:2:2 color format).

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

Video encoder 200 stores reconstructed blocks in DPB 218. For instance, in examples where operations of filter unit 216 are not needed, reconstruction unit 214 may store reconstructed blocks to DPB 218. In examples where operations of filter unit 216 are needed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

The operations described above are described with respect to a block. Such description should be understood as being operations for a luma coding block (or simply luma block) and/or chroma coding block (or simply chroma block). As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding blocks and the chroma coding blocks.

Video encoder 200 represents an example of a device configured to encode video data including a memory configured to store video data (e.g., motion vectors), and one or more processing units implemented in circuitry (e.g., at least one of fixed-function and programmable circuitry) and configured to determine, for a current block of a first color component, one or more blocks of a second color component that are co-located with the current block of the first color component, determine a motion vector for the current block of the first color component based on motion vectors for the one or more blocks of the second color component that are co-located with the current block, and encode the current block based on the determined motion vector.

In one example, to determine the motion vector for the current block, video encoder 200 is configured to determine the motion vector for the current block of the first color component based on a motion vector for only one of the one or more blocks of the second color component. For example, there is only one block of the second color component that is co-located with the current block of the first color component (e.g., in 4:4:4 color format).

For example, a color format for the current block of the first color component and the one or more blocks of the second color component is 4:4:4. In the 4:4:4 color format, the current block of the first color component may be co-located with only one block of the second color component. To determine the motion vector for the current block, video encoder 200 may be configured to determine the motion vector for the current block based on a motion vector of only the one block of the second color component that is co-located with the current block.

A color format for the current block of the first color component and the one or more blocks of the second color component is 4:2:2. In the 4:2:2 color format, the current block of the first color component may be co-located with two blocks of the second color component. To determine the motion vector for the current block, video encoder 200 may be configured to determine the motion vector for the current block based on a motion vector of only one of the two blocks of the second color component that are co-located with the current block.

A color format for the current block of the first color component and the one or more blocks of the second color component is 4:2:0. In the 4:2:0 color format, the current block of the first color component may be co-located with four blocks of the second color component. To determine the motion vector for the current block, video encoder 200 may be configured to determine the motion vector for the current block based on a motion vector of only one of the four blocks of the second color component that are co-located with the current block.

In some examples, the one or more blocks of the second color component comprise a plurality of blocks of the second color component. To determine the motion vector for the current block, video encoder 200 may be configured to perform a weighted average of motion vectors of the plurality of blocks of the second color component and determine the motion vector of the current block of the first color component based on the weighted averaged motion vectors of the plurality of blocks of the second color component.

A color format for the current block of the first color component and the one or more blocks of the second color component is 4:2:2. In the 4:2:2 color format, the current block of the first color component may be co-located with two blocks of the second color component. To determine the motion vector for the current block, video encoder 200 may determine the motion vector for the current block based on the weighted average of motion vectors of the two blocks of the second color component that are co-located with the current block of the first color component.

A color format for the current block of the first color component and the one or more blocks of the second color component is 4:2:0. In the 4:2:0 color format, the current block of the first color component may be co-located with four blocks of the second color component. To determine the motion vector for the current block, video encoder 200 may be configured to determine the motion vector for the current block based on the weighted average of motion vectors of two or more of the four blocks of the second color component that are co-located with the current block.

Figure 11:
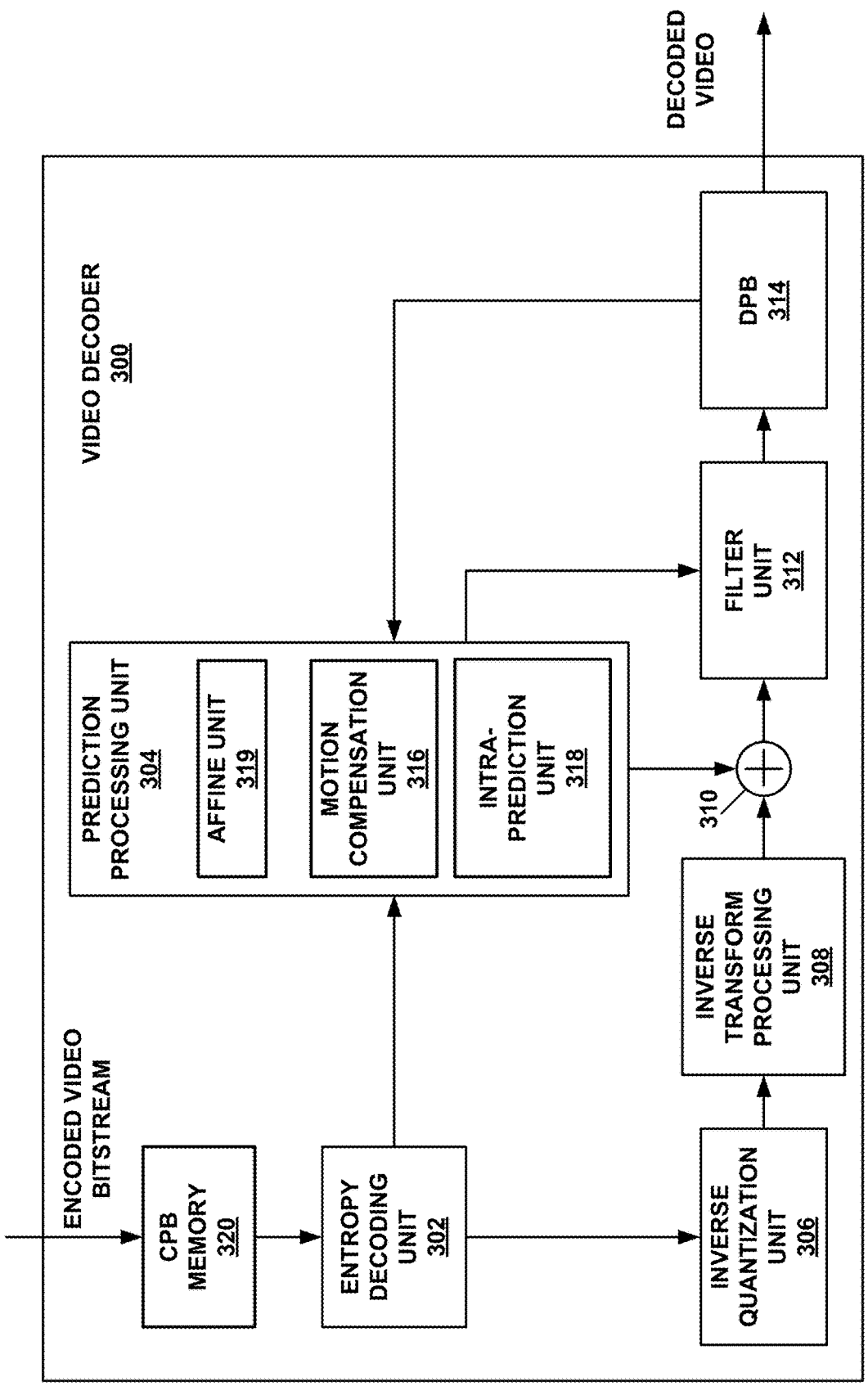
FIG. 11 is a block diagram illustrating an example video decoder that may perform the techniques of this disclosure.

FIG. 11 is a block diagram illustrating an example video decoder 300 that may perform the techniques of this disclosure. FIG. 11 is provided for purposes of explanation and is not limiting on the techniques as broadly exemplified and described in this disclosure. For purposes of explanation, this disclosure describes video decoder 300 is described according to the techniques of JEM, VVC, and HEVC. However, the techniques of this disclosure may be performed by video coding devices that are configured to other video coding standards.

In the example of FIG. 11, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. Moreover, video decoder 300 may include additional or alternative processors or processing circuitry to perform these and other functions.

Prediction processing unit 304 includes motion compensation unit 316 and intra-prediction unit 318. Prediction processing unit 304 may include addition units to perform prediction in accordance with other prediction modes. As examples, prediction processing unit 304 may include a palette unit, an intra-block copy unit (which may form part of motion compensation unit 316), an affine unit 319, a linear model (LM) unit, or the like. In other examples, video decoder 300 may include more, fewer, or different functional components.

For example, prediction processing unit 304 may be configured to determine that a coding mode for a first CU is affine mode (e.g., CU that includes luma block 168 and chroma block 170). Prediction processing unit 304 may also be configured to determine that color format for a first luma block (e.g., luma block 168) of the first CU and a first chroma block (e.g., chroma block 170) of the first CU is 4:4:4 color format (e.g., based on syntax parameters signaled by video encoder 200). Similarly, prediction processing unit 304 may be configured to determine that a coding mode for a second CU (e.g., CU that includes luma block 176) in a different picture than the first CU is affine mode. Prediction processing unit 304 may also be configured to determine that color format for a second luma block (e.g., luma block 176) of the second CU and a second chroma block (e.g., chroma block 178) of the second CU is 4:2:2 or 4:2:0 color format (e.g., based on syntax parameters signaled by video encoder 200).

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as dynamic random access memory (DRAM), including synchronous DRAM (SDRAM), magnetoresistive RAM (MRAM), resistive RAM (RRAM), or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to executed by processing circuitry of video decoder 300.

The various units shown in FIG. 11 are illustrated to assist with understanding the operations performed by video decoder 300. The units may be implemented as fixed-function circuits, programmable circuits, or a combination thereof. Similar to FIG. 10, fixed-function circuits refer to circuits that provide particular functionality, and are preset on the operations that can be performed. Programmable circuits refer to circuits that can programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 10).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 10). Intra-prediction unit 318 may retrieve data of neighboring samples to the current block from DPB 314.

In some examples, an affine unit 319, which may be part of motion compensation unit 316 or a separate unit as illustrated, may be configured to determine control point motion vectors for the first CU (e.g., CU with 4:4:4 color format described above) and determine control point motion vectors for the second CU (e.g., CU with 4:2:2 or 4:2:0 color format described above). Affine unit 319 may be configured to determine a motion vector for each sub-block (e.g., luma sub-blocks 172A-172D) of the first luma block (e.g., luma block 168) based on control point motion vectors for the first CU and determine a motion vector for each sub-block (e.g., luma sub-blocks 180A-180D) of the second luma block (e.g., luma block 176) based on control point motion vectors for the second CU.

For the first CU (e.g., with 4:4:4 color format), affine unit 319 may determine a motion vector for each sub-block (e.g., chroma sub-blocks 174A-174D) of the chroma block (e.g., chroma block 170) based only on the motion vector of each co-located sub-block (e.g., luma sub-blocks 172A-172D) of the luma block (e.g., luma block 168). For example, affine unit 319 may set motion vectors for each of chroma sub-blocks 174A-174D equal to respective co-located luma sub-blocks 172A-172D, but there may be some scaling for fractional accuracy of the motion vectors.

For the second CU (e.g., with 4:2:2 or 4:2:0 color format), affine unit 319 may determine a motion vector for each sub-block (e.g., chroma sub-blocks 182A and 182B) of the second chroma block (e.g., chroma block 178) based on an average of motion vectors of two or more co-located sub-blocks (e.g., luma sub-blocks 180A-180D) of the second luma block (e.g., luma block 176). For instance, for 4:2:2 color format, affine unit 319 may determine, for each chroma sub-block 182A and 182B of chroma block 178, an average of motion vectors of two sub-blocks (e.g., luma sub-blocks 180A and 180B for chroma sub-block 182A and luma sub-blocks 180C and 180D for chroma sub-block 182B) of luma block 176. In some examples, for each sub-block (e.g., chroma sub-blocks 182A and 182B) of chroma block 178, the average of motion vectors of two sub-blocks (e.g., luma sub-blocks 180A and 180B for chroma sub-block 182A and luma sub-blocks 180C and 180D for chroma sub-block 182B) of luma block 176 may include determining, for each sub-block (e.g., chroma sub-blocks 182A and 182B) of chroma block 178, a weighted average of motion vectors of the two sub-blocks (e.g., luma sub-blocks 180A and 180B for chroma sub-block 182A and luma sub-blocks 180C and 180D for chroma sub-block 182B) of luma block 176.

Reconstruction unit 310 may reconstruct the current block using the prediction block and the residual block. For example, reconstruction unit 310 may add samples of the residual block to corresponding samples of the prediction block to reconstruct the current block.

In this way, reconstruction unit 310 may be considered as reconstructing the CU. For example, affine unit 319 may determine first prediction samples for each luma sub-block 172A-172D of luma block 168 based on the motion vector for each luma sub-block 172A-172D of luma block 168 and second prediction samples for each chroma sub-block 174A-174D of chroma block 170 based on the motion vector for each chroma sub-block 174A-174D of chroma block 170. Reconstruction unit 310 may receive information indicative of the residual samples for the CU. Reconstruction unit 310 may then reconstruct the CU based on the first prediction samples, the second prediction samples, and the residual samples. Affine unit 319 and reconstruction unit 310 may perform similar operations for luma block 176 and chroma block 178 (e.g., CU in 4:2:2 color format).

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures from DPB for subsequent presentation on a display device, such as display device 118 of FIG. 1.

In this manner, video decoder 300 represents an example of a video decoding device including a memory configured to store video data (e.g., motion vectors), and one or more processing units implemented in circuitry (e.g., at least one of fixed-function and programmable circuitry) and configured to determine, for a current block of a first color component, one or more blocks of a second color component that are co-located with the current block of the first color component, determine a motion vector for the current block of the first color component based on motion vectors for the one or more blocks of the second color component that are co-located with the current block, and decode the current block based on the determined motion vector.

In one example, to determine the motion vector for the current block, video decoder 300 is configured to determine the motion vector for the current block of the first color component based on a motion vector for only one of the one or more blocks of the second color component. For example, there is only one block of the second color component that is co-located with the current block of the first color component (e.g., in 4:4:4 color format).

For example, a color format for the current block of the first color component and the one or more blocks of the second color component is 4:4:4. In the 4:4:4 color format, the current block of the first color component may be co-located with only one block of the second color component. To determine the motion vector for the current block, video decoder 300 may be configured to determine the motion vector for the current block based on a motion vector of only the one block of the second color component that is co-located with the current block.

A color format for the current block of the first color component and the one or more blocks of the second color component is 4:2:2. In the 4:2:2 color format, the current block of the first color component may be co-located with two blocks of the second color component. To determine the motion vector for the current block, video decoder 300 may be configured to determine the motion vector for the current block based on a motion vector of only one of the two blocks of the second color component that are co-located with the current block.

A color format for the current block of the first color component and the one or more blocks of the second color component is 4:2:0. In the 4:2:0 color format, the current block of the first color component may be co-located with four blocks of the second color component. To determine the motion vector for the current block, video decoder 300 may be configured to determine the motion vector for the current block based on a motion vector of only one of the four blocks of the second color component that are co-located with the current block.

In some examples, the one or more blocks of the second color component comprise a plurality of blocks of the second color component. To determine the motion vector for the current block, video decoder 300 may be configured to perform a weighted average of motion vectors of the plurality of blocks of the second color component and determine the motion vector of the current block of the first color component based on the weighted averaged motion vectors of the plurality of blocks of the second color component.

A color format for the current block of the first color component and the one or more blocks of the second color component is 4:2:2. In the 4:2:2 color format, the current block of the first color component may be co-located with two blocks of the second color component. To determine the motion vector for the current block, video decoder 300 may determine the motion vector for the current block based on the weighted average of motion vectors of the two blocks of the second color component that are co-located with the current block of the first color component.

A color format for the current block of the first color component and the one or more blocks of the second color component is 4:2:0. In the 4:2:0 color format, the current block of the first color component may be co-located with four blocks of the second color component. To determine the motion vector for the current block, video decoder 300 may be configured to determine the motion vector for the current block based on the weighted average of motion vectors of two or more of the four blocks of the second color component that are co-located with the current block.

Figure 12:
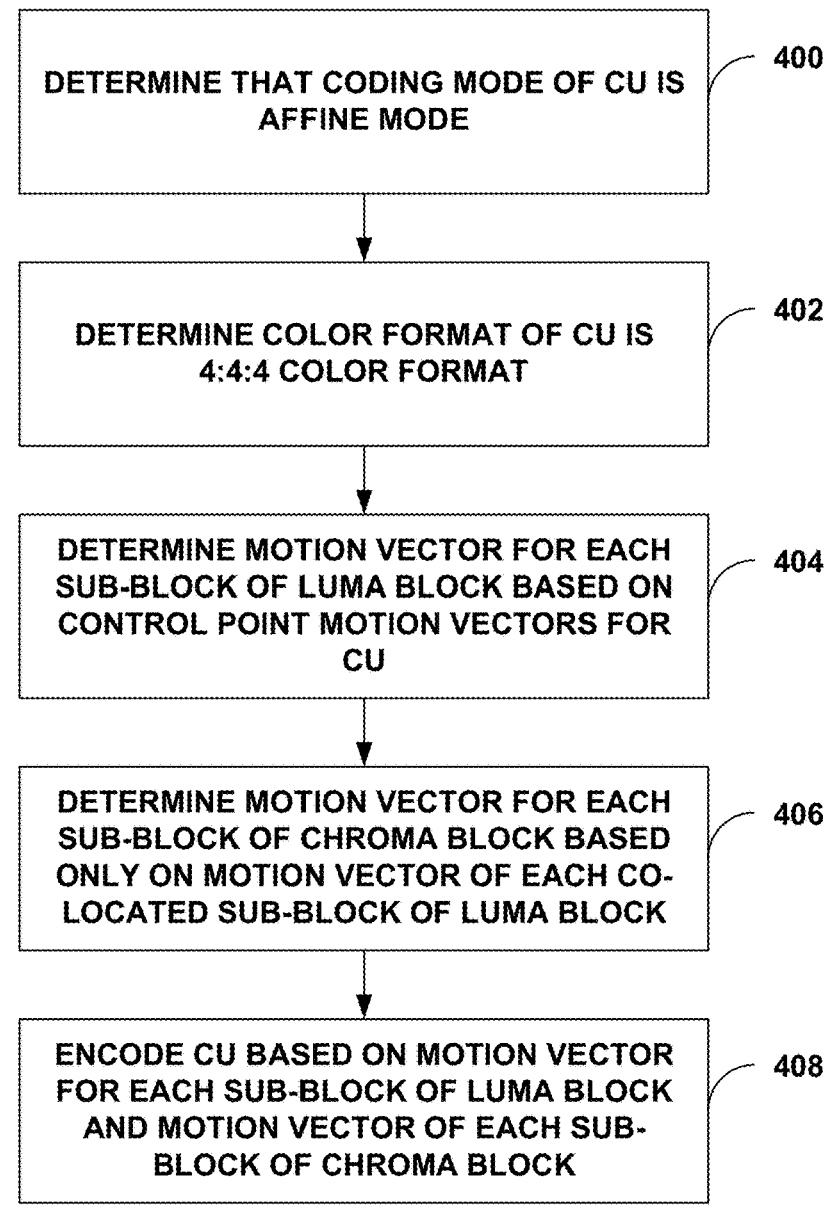
FIG. 12 is a flowchart illustrating an example method of encoding video data.

FIG. 12 is a flowchart illustrating an example method of encoding video data. For ease of discussion, FIG. 12 is described with respect to processing circuitry that includes at least one of fixed-function or programmable circuitry and is coupled to memory. Example of the processing circuitry of FIG. 12 includes video encoder 200, including affine unit 225, and the memory may be memory 106, video data memory 230, and DPB 218. For ease, FIG. 12 refers back to the example illustrated in FIG. 8.

The processing circuitry may determine that a coding mode of a CU is affine mode (400), such as based on rate-distortion values, and may determine that a color format of the CU that includes luma block 168 and chroma block 170 is 4:4:4 color format, such as based on rate-distortion values (402).

The processing circuitry may determine a motion vector for each sub-block (e.g., luma sub-blocks 172A-172D) based on control point motion vectors for the CU (404). For instance, the processing circuitry perform the operations of equation 5 above to determine the motion vector luma sub-blocks 172A-172D. In some examples, each one of luma sub-blocks 172A-172D may be of size 4×4.

The processing circuitry may determine a motion vector for each sub-block (e.g., chroma sub-blocks 174A-174D) of chroma block 170 based only on motion vector of each co-located sub-block of luma block 168 (406). For instance, the motion vector for chroma sub-block 174A may be based only on the motion vector of luma sub-block 172A, the motion vector for chroma sub-block 174B may be based only on the motion vector of luma sub-block 172B, and so forth. Each one of chroma sub-blocks 174A-174D may be of size 4×4, and a ratio of a height of the luma block 168 to a height of the chroma block 170 is equal to 1, and a ratio of a width of the luma block 168 to a width of the chroma block 170 is equal to 1.

The processing circuitry may encode the CU based on motion vector for each luma sub-block 172A-172D of luma block 168 and motion vector for each chroma sub-block 174A-174D of chroma block 170 (408). For example, the processing circuitry may determine first prediction samples for each luma sub-block 172A-172D of the luma block 168 based on the motion vector for each luma sub-block 172A-172D of the luma block 168 and second prediction samples for each chroma sub-block 174A-174D of the chroma block 170 based on the motion vector for each chroma sub-block 174A-174D of the chroma block 170. The processing circuity may determine residual samples based on differences between the first prediction samples and samples of the luma block 168 and differences between the second prediction samples and samples of the chroma block 170, and signal information indicative of the residual samples.

Figure 13:
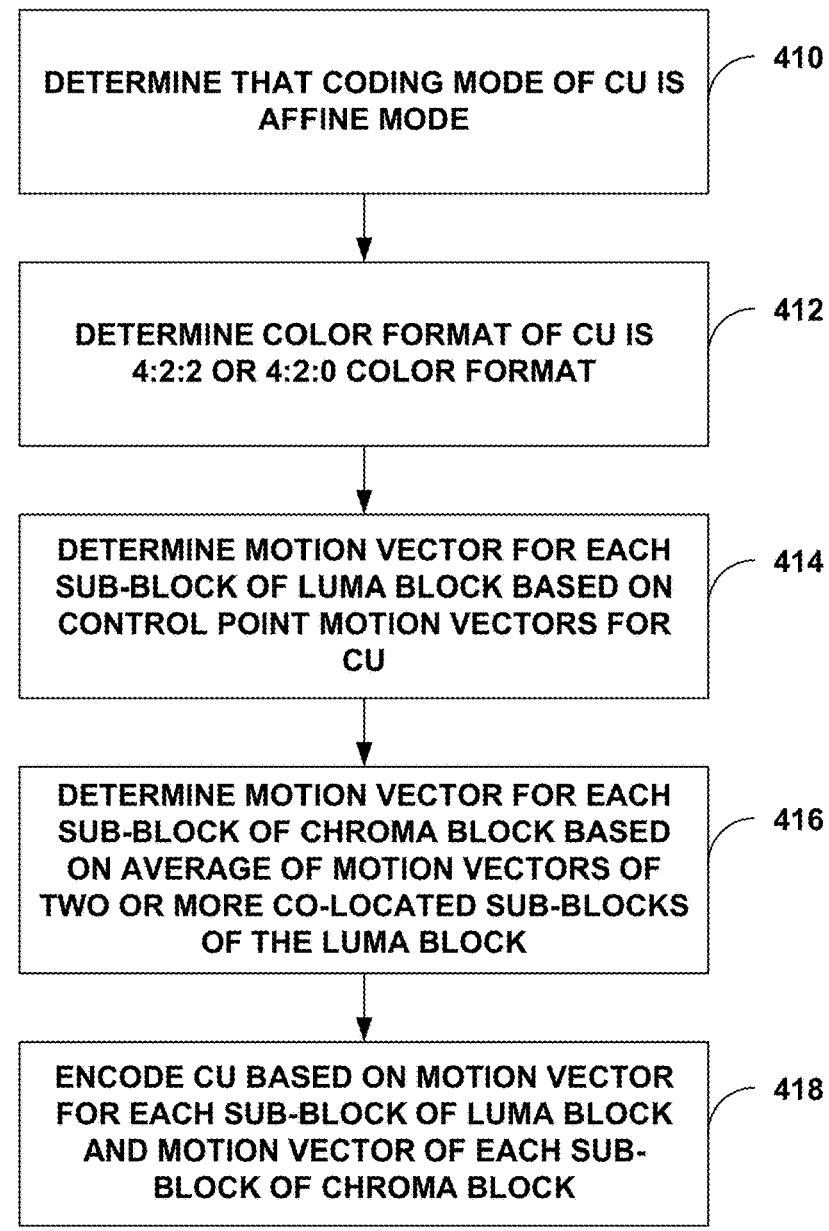
FIG. 13 is a flowchart illustrating another example method of encoding video data.

FIG. 13 is a flowchart illustrating another example method of encoding video data. For ease of discussion, FIG. 13 is described with respect to processing circuitry that includes at least one of fixed-function or programmable circuitry and is coupled to memory. Example of the processing circuitry of FIG. 13 includes video encoder 200, including affine unit 225, and the memory may be memory 106, video data memory 230, and DPB 218. For ease, FIG. 13 refers back to the example illustrated in FIG. 9.

For example, the example illustrated in FIG. 8 may be for a first CU that includes luma block 168 (e.g., first luma block) and chroma block 170 (e.g., first chroma block) in a first picture, and FIG. 9 may be for a second CU that includes luma block 176 (e.g., second luma block) and chroma block 178 (e.g., second chroma block) in a second picture. The example of FIG. 12 may be considered with respect to the first CU of the first picture, and the example of FIG. 13 may be considered with respect to the second CU of the second picture.

The processing circuitry may determine that a coding mode of a CU is affine mode (410), such as based on rate-distortion values, and may determine that a color format of the CU that includes luma block 176 and chroma block 178 is 4:2:2 color format, such as based on rate-distortion values (412).

The processing circuitry may determine a motion vector for each sub-block (e.g., luma sub-blocks 180A-180D) based on control point motion vectors for the CU (414). For instance, the processing circuitry perform the operations of equation 5 above to determine the motion vector luma sub-blocks 180A-180D. In some examples, each one of luma sub-blocks 180A-180D may be of size 4×4.

The processing circuitry may determine a motion vector for each sub-block (e.g., chroma sub-blocks 182A and 182B) of chroma block 178 based on an average of motion vectors of two or more co-located luma sub-blocks 180A-180D of luma block 176 (416). For instance, the motion vector for chroma sub-block 182A may be based on the average of motion vectors of luma sub-blocks 180A and 180B, and the motion vector for chroma sub-block 182B may be based on the average of motion vectors of luma sub-block 180C and 180D, and so forth. Each one of chroma sub-blocks 182A and 182B may be of size 4×4, and a ratio of a height of the luma block 176 to a height of the chroma block 178 is equal to 1, but a ratio of a width of the luma block 176 to a width of the chroma block 178 is equal to ½.

The processing circuitry may encode the CU based on motion vector for each luma sub-block 180A-180D of luma block 176 and motion vector for each chroma sub-block 182A and 182B of chroma block 178 (418). For example, the processing circuitry may determine first prediction samples for each luma sub-block 180A-180D of the luma block 176 based on the motion vector for each luma sub-block 180A-180D of the luma block 176 and second prediction samples for each chroma sub-block 182A and 182B of the chroma block 178 based on averaging of motion vectors for luma sub-blocks 180A and 180B for chroma sub-block 182A and averaging of motion vectors for luma sub-blocks 180C and 180D for chroma sub-block 182B of the chroma block 178. The processing circuity may determine residual samples based on differences between the first prediction samples and samples of the luma block 176 and differences between the second prediction samples and samples of the chroma block 178, and signal information indicative of the residual samples.

Figure 14:
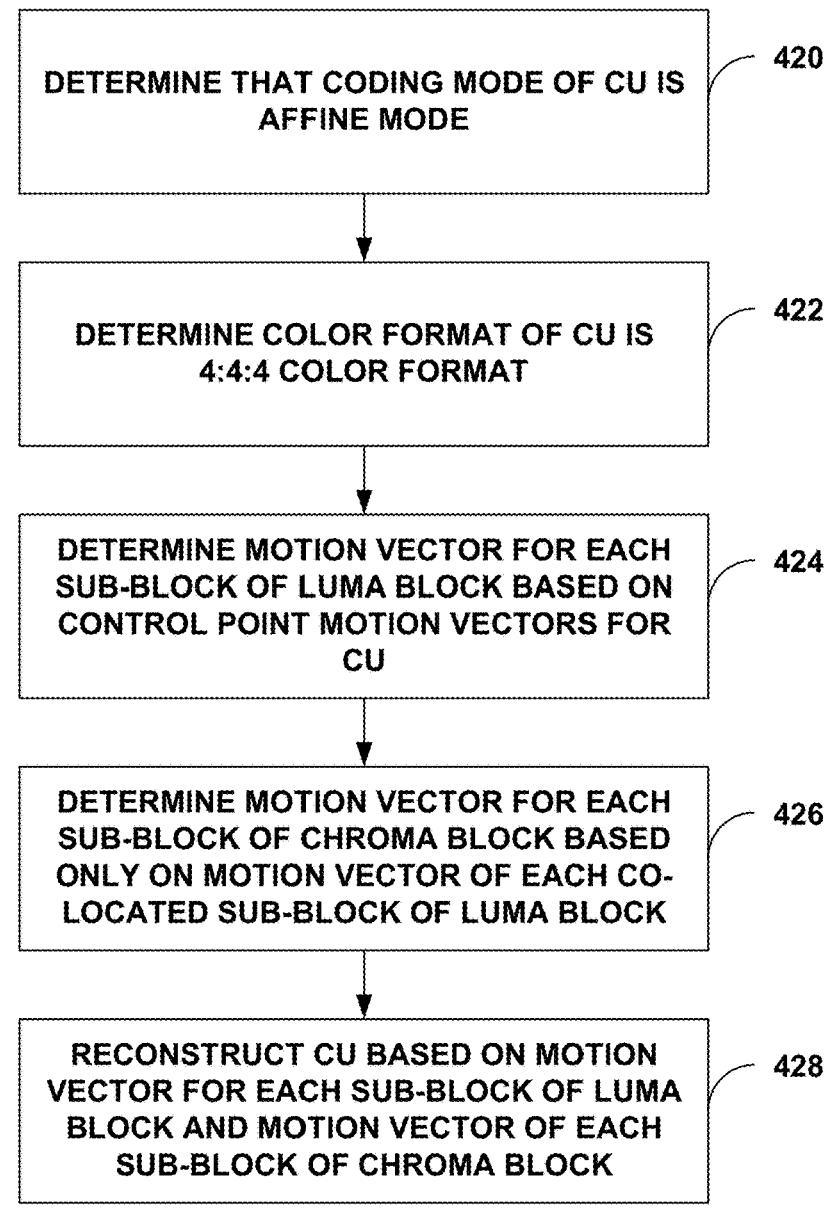
FIG. 14 is a flowchart illustrating an example method of decoding video data.

FIG. 14 is a flowchart illustrating an example method of decoding video data. For ease of discussion, FIG. 14 is described with respect to processing circuitry that includes at least one of fixed-function or programmable circuitry and is coupled to memory. Example of the processing circuitry of FIG. 14 includes video decoder 300, including affine unit 319, and the memory may be memory 120, CPB memory 320, and DPB 314. For ease, FIG. 14 refers back to the example illustrated in FIG. 8.

The processing circuitry may determine that a coding mode of a CU is affine mode (420), such as based on received syntax parameters, and may determine that a color format of the CU that includes luma block 168 and chroma block 170 is 4:4:4 color format, such as based on received syntax parameters (422).

The processing circuitry may determine a motion vector for each sub-block (e.g., luma sub-blocks 172A-172D) based on control point motion vectors for the CU (424). For instance, the processing circuitry perform the operations of equation 5 above to determine the motion vector luma sub-blocks 172A-172D. In some examples, each one of luma sub-blocks 172A-172D may be of size 4×4.

The processing circuitry may determine a motion vector for each sub-block (e.g., chroma sub-blocks 174A-174D) of chroma block 170 based only on motion vector of each co-located sub-block of luma block 168 (406). For instance, the motion vector for chroma sub-block 174A may be based only on the motion vector of luma sub-block 172A, the motion vector for chroma sub-block 174B may be based only on the motion vector of luma sub-block 172B, and so forth. Each one of chroma sub-blocks 174A-174D may be of size 4×4, and a ratio of a height of the luma block 168 to a height of the chroma block 170 is equal to 1, and a ratio of a width of the luma block 168 to a width of the chroma block 170 is equal to 1.

The processing circuitry may reconstruct the CU based on motion vector for each luma sub-block 172A-172D of luma block 168 and motion vector for each chroma sub-block 174A-174D of chroma block 170 (418). For example, the processing circuitry may determine first prediction samples for each luma sub-block 172A-172D of the luma block 168 based on the motion vector for each luma sub-block 172A-172D of the luma block 168 and second prediction samples for each chroma sub-block 174A-174D of the chroma block 170 based on the motion vector for each chroma sub-block 174A-174D of the chroma block 170. The processing circuitry may receive information indicative of the residual samples of the CU, and reconstruct the CU based on the first prediction samples, the second prediction samples, and the residual samples.

Figure 15:
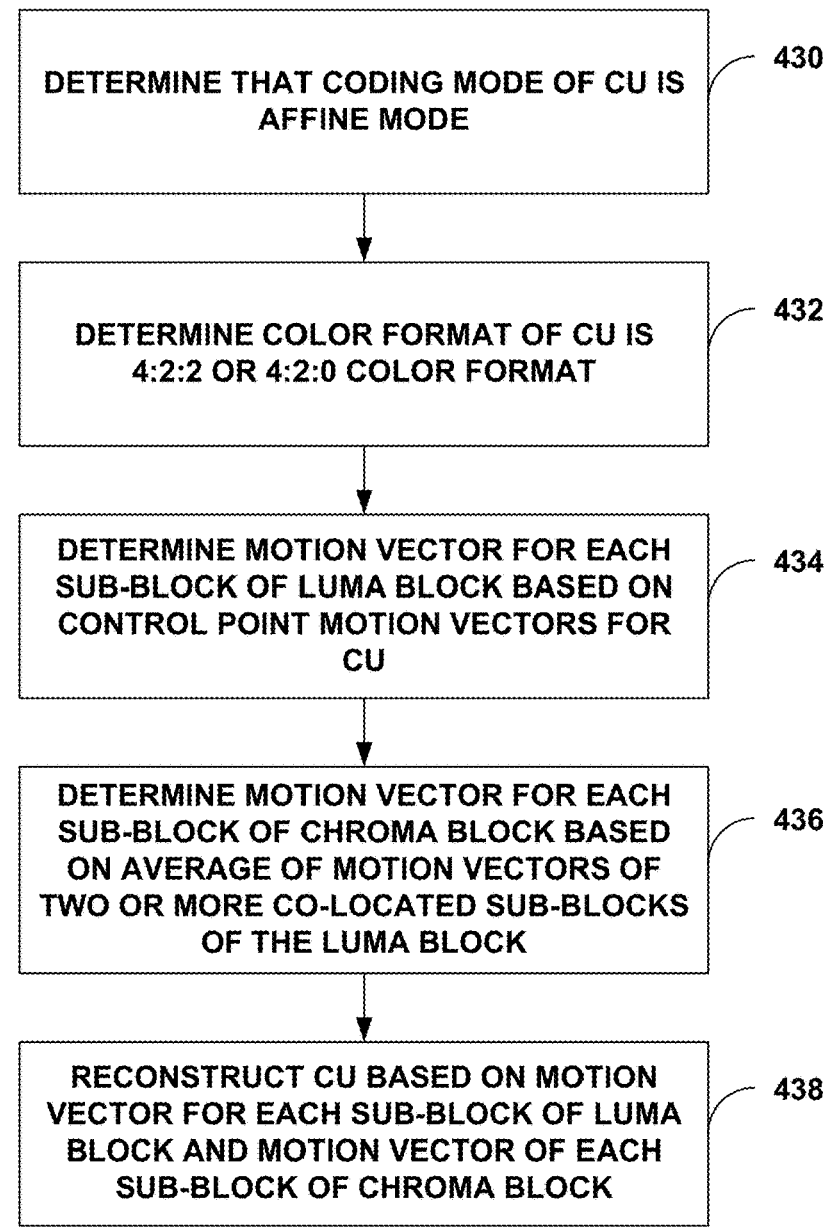
FIG. 15 is a flowchart illustrating another example method of decoding video data.

FIG. 15 is a flowchart illustrating another example method of decoding video data. For ease of discussion, FIG. 15 is described with respect to processing circuitry that includes at least one of fixed-function or programmable circuitry and is coupled to memory. Example of the processing circuitry of FIG. 15 includes video decoder 300, including affine unit 319, and the memory may be memory 120, CPB memory 320, and DPB 314. For ease, FIG. 15 refers back to the example illustrated in FIG. 9.

For example, as described above, the example illustrated in FIG. 8 may be for a first CU that includes luma block 168 (e.g., first luma block) and chroma block 170 (e.g., first chroma block) in a first picture, and FIG. 9 may be for a second CU that includes luma block 176 (e.g., second luma block) and chroma block 178 (e.g., second chroma block) in a second picture. The example of FIG. 14 may be considered with respect to the first CU of the first picture, and the example of FIG. 15 may be considered with respect to the second CU of the second picture.

The processing circuitry may determine that a coding mode of a CU is affine mode (430), such as based on received syntax parameters, and may determine that a color format of the CU that includes luma block 176 and chroma block 178 is 4:2:2 color format, such as based on received syntax parameters (432).

The processing circuitry may determine a motion vector for each sub-block (e.g., luma sub-blocks 180A-180D) based on control point motion vectors for the CU (414). For instance, the processing circuitry perform the operations of equation 5 above to determine the motion vector luma sub-blocks 180A-180D. In some examples, each one of luma sub-blocks 180A-180D may be of size 4×4.

The processing circuitry may determine a motion vector for each sub-block (e.g., chroma sub-blocks 182A and 182B) of chroma block 178 based on an average of motion vectors of two or more co-located luma sub-blocks 180A-180D of luma block 176 (416). For instance, the motion vector for chroma sub-block 182A may be based on the average of motion vectors of luma sub-blocks 180A and 180B, and the motion vector for chroma sub-block 182B may be based on the average of motion vectors of luma sub-block 180C and 180D, and so forth. Each one of chroma sub-blocks 182A and 182B may be of size 4×4, and a ratio of a height of the luma block 176 to a height of the chroma block 178 is equal to 1, but a ratio of a width of the luma block 176 to a width of the chroma block 178 is equal to ½.

The processing circuitry may reconstruct the CU based on motion vector for each luma sub-block 180A-180D of luma block 176 and motion vector for each chroma sub-block 182A and 182B of chroma block 178 (418). For example, the processing circuitry may determine first prediction samples for each luma sub-block 180A-180D of the luma block 176 based on the motion vector for each luma sub-block 180A-180D of the luma block 176 and second prediction samples for each chroma sub-block 182A and 182B of the chroma block 178 based on averaging of motion vectors for luma sub-blocks 180A and 180B for chroma sub-block 182A and averaging of motion vectors for luma sub-blocks 180C and 180D for chroma sub-block 182B of the chroma block 178. The processing circuitry may receive information indicative of the residual samples for the CU, and may reconstruct the CU based on the first prediction samples, the second prediction samples, and the residual samples.

The following describes one or more examples that may be used separately or in combination. The following examples should not be considered limiting.

Example 1

A method of coding video data, the method comprising determining, for a current block of a first color component, one or more blocks of a second color component that are co-located with the current block of the first color component, determining a motion vector for the current block of the first color component based on motion vectors for the one or more blocks of the second color component that are co-located with the current block, and coding the current block based on the determined motion vector.

Example 2

The method of example 1, wherein determining the motion vector for the current block comprises determining the motion vector for the current block of the first color component based on a motion vector for only one of the one or more blocks of the second color component.

Example 3

The method of any of examples 1 and 2, wherein there is only one block of the second color component that is co-located with the current block of the first color component.

Example 4

The method of any of examples 1-3, wherein a color format for the current block of the first color component and the one or more blocks of the second color component is 4:4:4, wherein in the 4:4:4 color format, the current block of the first color component is co-located with only one block of the second color component, and wherein determining the motion vector for the current block comprises determining the motion vector for the current block based on a motion vector of only the one block of the second color component that is co-located with the current block.

Example 5

The method of any of examples 1-3, wherein a color format for the current block of the first color component and the one or more blocks of the second color component is 4:2:2, wherein in the 4:2:2 color format, the current block of the first color component is co-located with two blocks of the second color component, and wherein determining the motion vector for the current block comprises determining the motion vector for the current block based on a motion vector of only one of the two blocks of the second color component that are co-located with the current block.

Example 6

The method of any of examples 1-3, wherein a color format for the current block of the first color component and the one or more blocks of the second color component is 4:2:0, wherein in the 4:2:0 color format, the current block of the first color component is co-located with four blocks of the second color component, and wherein determining the motion vector for the current block comprises determining the motion vector for the current block based on a motion vector of only one of the four blocks of the second color component that are co-located with the current block.

Example 7

The method of any of examples 2-6, wherein determining the motion vector for the current block of the first color component based on the motion vector for only one of the one or more blocks of the second color component comprises performing weighting of the motion vector for the only one of the one or more blocks of the second color component and determining the motion vector for the current block based on the weighting of the motion vector for the only one of the one or more blocks of the second color component.

Example 8

The method of example 7, further comprising one of signaling one or more parameters for one or more weights applied for performing the weighting of the motion vectors for the only one of the one or more blocks of the second color component or receiving one or more parameters for one or more weights applied for performing the weighting of the motion vectors for the only one of the one or more blocks of the second color component.

Example 9

The method of example 1, wherein the one or more blocks of the second color component comprise a plurality of blocks of the second color component, and wherein determining the motion vector for the current block comprises performing a weighted average of motion vectors of the plurality of blocks of the second color component and determining the motion vector of the current block of the first color component based on the weighted averaged motion vectors of the plurality of blocks of the second color component.

Example 10

The method of example 9, further comprising one of signaling one or more parameters for one or more weights applied for performing the weighted average of the motion vectors of the plurality of blocks of the second color component or receiving one or more parameters for one or more weights applied for performing the weighted average of the motion vectors for the plurality of blocks of the second color component.

Example 11

The method of any of examples 1, 9, or 10, wherein a color format for the current block of the first color component and the one or more blocks of the second color component is 4:2:2, wherein in the 4:2:2 color format, the current block of the first color component is co-located with two blocks of the second color component, and wherein determining the motion vector for the current block comprises determining the motion vector for the current block based on the weighted average of motion vectors of the two blocks of the second color component that are co-located with the current block of the first color component.

Example 12

The method of any of examples 1, 9, or 10, wherein a color format for the current block of the first color component and the one or more blocks of the second color component is 4:2:0, wherein in the 4:2:0 color format, the current block of the first color component is co-located with four blocks of the second color component, and wherein determining the motion vector for the current block comprises determining the motion vector for the current block based on the weighted average of motion vectors of two or more of the four blocks of the second color component that are co-located with the current block.

Example 13

The method of any of examples 1-12, wherein the one or more blocks of the second color component are co-located with the current block of the first color component based on the one or more blocks of the second color component and the current block of the first color component forming part of a same coding unit (CU).

Example 14

The method of any of examples 1-13, wherein the first color component comprises a chroma component, the second color component comprises a luma component.

Example 15

The method of any of examples 1-14, wherein coding the current block comprises decoding the current block, and wherein decoding the current block comprises determining a prediction block based on the determined motion vector, determining a residual block for the current block, and adding the prediction block and residual block to reconstruct the current block.

Example 16

The method of any of examples 1-14, wherein coding the current block comprises encoding the current block, and wherein encoding the current block comprises determining a prediction block, wherein the determined motion vector identifies the prediction block, determining a residual between the prediction block and the current block, and signaling information indicative of the residual.

Example 17

A device for coding video data, the device comprising a memory configured to store video data including information for one or more motion vectors and a video coder comprising at least one of programmable or fixed-function circuitry, wherein the video coder is configured to perform the method of any of examples 1-16.

Example 18

The device of example 17, further comprising a display configured to display decoded video data.

Example 19

The device of example 17 or 18, wherein the device comprises one or more of a camera, a computer, a mobile device, a broadcast receiver device, or a set-top box.

Example 20

A device for coding video data, the device comprising one or more means for performing the method of any of examples 1-16.

Example 21

A computer-readable storage medium having stored thereon instructions that, when executed, cause one or more processors to perform the method of any of examples 1-16.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
   determining that a coding mode for a first coding unit (CU) in a first picture is affine mode;
   determining that a color format of the first CU is 4:4:4 color format, wherein the first CU includes a first luma block, the first luma block comprising a plurality of first luma sub-blocks, and a first chroma block, the first chroma block comprising a plurality of first chroma sub-blocks;
   determining a motion vector for each of the first luma sub-blocks based on control point motion vectors for the first CU;
   based on the color format of the first CU being the 4:4:4 color format, setting a motion vector for each of the first chroma sub-blocks based only on the motion vector of each co-located luma sub-block of the first luma sub-blocks, and no other luma sub-block of the first luma sub-blocks;
   reconstructing the first CU based on the motion vector for each of the first luma sub-blocks and the motion vector for each of the first chroma sub-blocks;
   determining that a coding mode for a second CU in a second picture is affine mode, wherein the second picture is different from the first picture;
   determining that a color format of the second CU is 4:2:2 or 4:2:0 color format, wherein the second CU includes a second luma block, the second luma block comprising a plurality of second luma sub-blocks, and a second chroma block, the second chroma block comprising a plurality of second chroma sub-blocks;
   determining a motion vector for each of the second luma sub-blocks based on control point motion vectors for the second CU;
   based on the color format of the second CU being 4:2:2 or 4:2:0 color format, setting a motion vector for each of the second chroma sub-blocks based on an average of motion vectors of two or more co-located second luma sub-blocks; and
   reconstructing the second CU based on the motion vector for each of the second luma sub-blocks and the motion vector for each of the second chroma sub-blocks.

2. The method of claim 1, wherein determining the motion vector for each of the first chroma sub-blocks based only on the motion vector of each co-located luma sub-block of the first luma sub-blocks comprises setting the motion vector for each of the first chroma sub-blocks equal to the motion vector of each co-located luma sub-block of the first luma sub-blocks.

3. The method of claim 1, wherein determining that the color format of the second CU is 4:2:2 or 4:2:0 color format comprises determining that the color format of the second CU is 4:2:2 color format, the method further comprising:
   determining, for each of the second chroma sub-blocks, an average of motion vectors of two of the second luma sub-blocks,
   wherein setting the motion vector for each of the second chroma sub-blocks based on the average of motion vectors of two or more co-located second luma sub-blocks of comprises setting the motion vector for each of the second chroma sub-blocks based on the average of motion vectors of the two second luma sub-blocks.

4. The method of claim 3, wherein determining, for each of the second chroma sub-blocks, the average of motion vectors of two of the second luma sub-blocks comprises determining, for each of the second chroma sub-blocks, a weighted average of motion vectors of the two second luma sub-blocks.

5. The method of claim 1, wherein each of the first luma sub-blocks is of size 4x4, and each of the second chroma sub-blocks is of size 4x4.

6. The method of claim 1, wherein, in the 4:4:4 color format, a ratio of a height of the first luma block to a height of the first chroma block is equal to 1, and a ratio of a width of the first luma block to a width of the first chroma block is equal to 1.

7. The method of claim 1, wherein reconstructing the first CU based on the motion vector for each of the first luma sub-blocks and the motion vector for each of the first chroma sub-blocks comprises:
   determining first prediction samples for each of the first luma sub-blocks based on the motion vector for each of the first luma sub-blocks and second prediction samples for each of the first chroma sub-blocks based on the motion vector for each of the first chroma sub-blocks; and
   receiving information indicative of the residual samples for the first CU; and
   reconstructing the first CU based on the first prediction samples, the second prediction samples, and the residual samples.

8. A method of encoding video data, the method comprising:
   determining that a coding mode for a first coding unit (CU) in a first picture is affine mode;
   determining that a color format of the first CU is 4:4:4 color format, wherein the first CU includes a first luma block, the first luma block comprising a plurality of first luma sub-blocks, and a first chroma block, the first chroma block comprising a plurality of first chroma sub-blocks;
   determining a motion vector for each of the first luma sub-blocks based on control point motion vectors for the first CU;
   based on the color format of the first CU being the 4:4:4 color format, setting a motion vector for each of the first chroma sub-blocks based only on the motion vector of each co-located luma sub-block of the first luma sub-blocks, and no other luma sub-block of the first luma sub-blocks;
   encoding the first CU based on the motion vector for each of the first luma sub-blocks and the motion vector for each of the first chroma sub-blocks;
   determining that a coding mode for a second CU in a second picture is affine mode, wherein the second picture is different from the first picture;
   determining that a color format of the second CU is 4:2:2 or 4:2:0 color format, wherein the second CU includes a second luma block, the second luma block comprising a plurality of second luma sub-blocks, and a second chroma block, the second chroma block comprising a plurality of second chroma sub-blocks;
   determining a motion vector for each of the second luma sub-blocks based on control point motion vectors for the second CU;
   based on the color format of the second CU being 4:2:2 or 4:2:0 color format, setting a motion vector for each of the second chroma sub-blocks based on an average of motion vectors of two or more co-located second luma sub-blocks; and encoding the second CU based on the motion vector for each of the second luma sub-blocks and the motion vector for each of the second chroma sub-blocks.

9. The method of claim 8, wherein determining the motion vector for each of the first chroma sub-blocks based only on the motion vector of each co-located luma sub-block of the first luma sub-blocks comprises setting the motion vector for each of the first chroma sub-blocks equal to the motion vector of each co-located luma sub-block of the first luma sub-blocks.

10. The method of claim 8, wherein determining that the color format of the second CU is 4:2:2 or 4:2:0 color format comprises determining that the color format of the second CU is 4:2:2 color format, the method further comprising:

determining, for each of the second chroma sub-blocks, an average of motion vectors of two of the second luma sub-blocks, wherein setting the motion vector for each of the second chroma sub-blocks based on the average of motion vectors of two or more co-located second luma sub-blocks comprises setting the motion vector for each of the second chroma sub-blocks based on the average of motion vectors of the two second luma sub-blocks.

11. The method of claim 10, wherein determining, for each of the second chroma sub-blocks, the average of motion vectors of two of the second luma sub-blocks comprises determining, for each of the second chroma sub-blocks, a weighted average of motion vectors of the two second luma sub-blocks.

12. The method of claim 8, wherein each of the first luma sub-blocks is of size 4x4, and each of the second chroma sub-blocks is of size 4x4.

13. The method of claim 8, wherein, in the 4:4:4 color format, a ratio of a height of the first luma block to a height of the first chroma block is equal to 1, and a ratio of a width of the first luma block to a width of the first chroma block is equal to 1.

14. The method of claim 8, wherein encoding the first CU based on the motion vector for each of the first luma sub-blocks and the motion vector for each of the first chroma sub-blocks comprises:

determining first prediction samples for each of the first luma sub-blocks based on the motion vector for each of the first luma sub-blocks and second prediction samples for each of the first chroma sub-blocks based on the motion vector for each of the first chroma sub-blocks;

determining residual samples based on differences between the first prediction samples and samples of the first luma block and differences between the second prediction samples and samples of the first chroma block; and signaling information indicative of the residual samples.

15. A device for coding video data, the device comprising:

memory configured to store the video data; and processing circuitry coupled to the memory and comprising at least one of fixed-function or programmable circuitry, wherein the processing circuitry is configured to:

determine that a coding mode for a first coding unit (CU) in a first picture is affine mode;

determine that a color format of the first CU is 4:4:4 color format, wherein the first CU includes a first luma block, the first luma block comprising a plurality of first luma sub-blocks, and a first chroma block, the first chroma block comprising a plurality of first chroma sub-blocks;

determine a motion vector for each of the first luma sub-blocks based on control point motion vectors for the first CU;

based on the color format of the first CU being the 4:4:4 color format, set a motion vector for each of the first chroma sub-blocks based only on the motion vector of each co-located luma sub-block of the first luma sub-blocks, and no other luma sub-block of the first luma sub-blocks;

code the first CU based on the motion vector for each of the first luma sub-blocks and the motion vector for each of the first chroma sub-blocks;

determine that a coding mode for a second CU in a second picture is affine mode, wherein the second picture is different from the first picture;

determine that a color format of the second CU is 4:2:2 or 4:2:0 color format, wherein the second CU includes a second luma block, the second luma block comprising a plurality of second luma sub-blocks and a second chroma block, the second chroma block comprising a plurality of second chroma sub-blocks;

determine a motion vector for each of the second luma sub-blocks based on control point motion vectors for the second CU;

based on the color format of the second CU being 4:2:2 or 4:2:0 color format, set a motion vector for each of the second chroma sub-blocks based on an average of motion vectors of two or more co-located second luma sub-blocks; and code the second CU based on the motion vector for each of the second luma sub-blocks and the motion vector for each of the second chroma sub-blocks.

16. The device of claim 15, wherein to determine the motion vector for each of the first chroma sub-blocks based only on the motion vector of each co-located luma sub-block of the first luma sub-blocks, the processing circuitry is configured to set the motion vector for each of the first chroma sub-blocks equal to the motion vector of each co-located luma sub-block of the first luma sub-blocks.

17. The device of claim 15, wherein to determine that the color format of the second CU is 4:2:2 or 4:2:0 color format, the processing circuitry is configured to determine that the color format of the second CU is 4:2:2 color format, and wherein the processing circuitry is configured to:

determine, for each of the second chroma sub-blocks, an average of motion vectors of two of the second luma sub-blocks, wherein to set the motion vector for each of the second chroma sub-blocks based on the average of motion vectors of two or more co-located second luma sub-blocks, the processing circuitry is configured to set the motion vector for each of the second chroma sub-blocks based on the average of motion vectors of the two second luma sub-blocks.

18. The device of claim 17, wherein to determine, for each of the second chroma sub-blocks, the average of motion vectors of two of the second luma sub-blocks, the processing circuitry is configured to determine, for each of the second chroma sub-blocks, a weighted average of motion vectors of the two second luma sub-blocks.

19. The device of claim 15, wherein each of the first luma sub-blocks is of size 4x4, and each of the first chroma sub-blocks is of size 4x4.

20. The device of claim 15, wherein, in the 4:4:4 color format, a ratio of a height of the first luma block to a height of the first chroma block is equal to 1, and a ratio of a width of the first luma block to a width of the first chroma block is equal to 1.

21. The device of claim 15, wherein to code the first CU based on the motion vector for each of the first luma sub-blocks and the motion vector for each of the first chroma sub-blocks, the processing circuitry is configured to reconstruct the first CU, and wherein to reconstruct the first CU, the processing circuitry is configured to:
   determine first prediction samples for each of the first luma sub-blocks based on the motion vector for each of the first luma sub-blocks and second prediction samples for each of the first chroma sub-blocks based on the motion vector for each of the first chroma sub-blocks; and
   receive information indicative of the residual samples for the first CU; and
   reconstruct the first CU based on the first prediction samples, the second prediction samples, and the residual samples.

22. The device of claim 15, wherein to code the first CU based on the motion vector for each of the first luma sub-blocks and the motion vector for each of the first chroma sub-blocks, the processing circuitry is configured to encode the first CU, and wherein to encode the first CU, the processing circuitry is configured to:
   determine first prediction samples for each of the first luma sub-blocks based on the motion vector for each of the first luma sub-blocks and second prediction samples for each of the first chroma sub-blocks based on the motion vector for each of the first chroma sub-blocks;
   determine residual samples based on differences between the first prediction samples and samples of the first luma block and differences between the second prediction samples and samples of the first chroma block; and
   signal information indicative of the residual samples.

23. The device of claim 15, wherein the device comprises a wireless communication device.

24. A computer-readable storage medium having instructions stored thereon that when executed cause one or more processors of a device for coding video data to:
   determine that a coding mode for a first coding unit (CU) of a first picture is affine mode;
   determine that a color format of the first CU is 4:4:4 color format, wherein the first CU includes a first luma block, the first luma block comprising a plurality of first luma sub-blocks, and a first chroma block, the first chroma block comprising a plurality of first chroma sub-blocks;
   determine a motion vector for each of the first luma sub-blocks based on control point motion vectors for the first CU;
   based on the color format of the first CU being the 4:4:4 color format, set a motion vector for each of the first chroma sub-blocks based only on the motion vector of each co-located luma sub-block of the first luma sub-blocks, and no other luma sub-block of the first luma sub-blocks;
   code the first CU based on the motion vector for each of the first luma sub-blocks and the motion vector for each of the first chroma sub-blocks;
   determine that a coding mode for a second CU in a second picture is affine mode, wherein the second picture is different from the first picture;
   determine that a color format of the second CU is 4:2:2 or 4:2:0 color format, wherein the second CU includes a second luma block, the second luma block comprising a plurality of second luma sub-blocks, and a second chroma block, the second chroma block comprising a plurality of second chroma sub-blocks;
   determine a motion vector for each of the second luma sub-blocks based on control point motion vectors for the second CU;
   based on the color format of the second CU being 4:2:2 or 4:2:0 color format, set a motion vector for each of the second chroma sub-blocks based on an average of motion vectors of two or more co-located luma sub-blocks of the second luma sub-blocks; and
   code the second CU based on the motion vector for each of the second luma sub-blocks and the motion vector for each of the second chroma sub-blocks.

25. A device for coding video data, the device comprising:
   means for determining that a coding mode for a first coding unit (CU) is affine mode;
   means for determining that a color format of the first CU is 4:4:4 color format, wherein the first CU that includes a first luma block, the first luma block comprising a plurality of first luma sub-blocks, and a first chroma block, the first chroma block comprising a plurality of first chroma sub-blocks;
   means for determining a motion vector for each of the first luma sub-blocks based on control point motion vectors for the first CU;
   means for setting a motion vector for each of the first chroma sub-blocks based only on the motion vector of each co-located luma sub-block of the first luma sub-blocks, and no other luma sub-block of the first luma sub-blocks, based on the color format of the first CU being the 4:4:4 color format;
   means for coding the first CU based on the motion vector for each of the first luma sub-blocks and the motion vector for each of the chroma sub-blocks;
   means for determining that a coding mode for a second CU in a second picture is affine mode, wherein the second picture is different from the first picture;
   means for determining that a color format of the second CU is 4:2:2 or 4:2:0 color format, wherein the second CU includes a second luma block, the second luma block comprising a plurality of second luma sub-blocks, and a second chroma block, the second chroma block comprising a plurality of second chroma sub-blocks;
   means for determining a motion vector for each of the second luma sub-blocks based on control point motion vectors for the second CU;
   means for setting a motion vector for each of the second chroma sub-blocks based on an average of motion vectors of two or more co-located second luma sub-blocks based on the color format of the second CU being 4:2:2 or 4:2:0 color format; and
   means for coding the second CU based on the motion vector for each of the second luma sub-blocks and the motion vector for each of the second chroma sub-blocks.

26. The method of claim 3, wherein determining that the coding mode for the first CU in the first picture is affine mode comprises determining that the coding mode for the first CU in the first picture is affine mode based on a received syntax element.

27. The device of claim 17, wherein to determine that the coding mode for the first CU in the first picture is affine mode, the processing circuitry is configured to determine that the coding mode for the first CU in the first picture is affine mode based on a received syntax element.

28. The computer-readable storage medium of claim 24, wherein the instructions that cause the one or more processors to determine that the coding mode for the first CU in the first picture is affine mode comprise instructions that cause the one or more processors to determine that the coding mode for the first CU in the first picture is affine mode based on a received syntax element.

29. The device of claim 25, wherein the means for determining that the coding mode for the first CU in the first picture is affine mode comprises means for determining that the coding mode for the first CU in the first picture is affine mode based on a received syntax element.

* * * * *